US006688364B2

(12) United States Patent
Simpson

(10) Patent No.: US 6,688,364 B2
(45) Date of Patent: Feb. 10, 2004

(54) SIGN APPLIQUE TRANSFER AND ASSEMBLY APPARATUS

(76) Inventor: Robert C. Simpson, 911 Eighth Ave. North, Lewistown, MT (US) 59457

( * ) Notice: Subject to any disclaimer, the term of this patent is extended or adjusted under 35 U.S.C. 154(b) by 0 days.

(21) Appl. No.: 09/815,950

(22) Filed: Mar. 22, 2001

(65) Prior Publication Data

US 2002/0134496 A1 Sep. 26, 2002

(51) Int. Cl.[7] .............................. B44C 1/10; B44C 7/02; B32B 31/20; B32B 33/00; G09F 7/12

(52) U.S. Cl. ....................... 156/540; 156/543; 156/577; 156/580; 156/230; 156/350; 40/594; 428/42.1; 428/914

(58) Field of Search ................................ 156/540, 541, 156/543, 574, 576, 577, 580, 582, 230, 235, 237, 240, 241, 247, 289, 350; 40/584, 594, 595; 428/42.1, 195, 914

(56) References Cited

U.S. PATENT DOCUMENTS

| | | | | | |
|---|---|---|---|---|---|
| 1,979,811 | A | | 11/1934 | Reardon | |
| 2,250,266 | A | | 7/1941 | Kaye | |
| 2,351,274 | A | | 6/1944 | McCarter | |
| 2,711,691 | A | | 6/1955 | Leavens, Jr. | 101/216 |
| 2,818,908 | A | * | 1/1958 | Byrnes et al. | 154/41 |
| 2,990,000 | A | | 6/1961 | Mangus et al. | 153/40 |
| 3,323,454 | A | * | 6/1967 | McFarland | 101/269 |
| 3,430,559 | A | | 3/1969 | Moldovan et al. | 101/269 |
| 3,522,132 | A | * | 7/1970 | Cardis | 156/494 |
| 3,551,262 | A | | 12/1970 | Kelly | 156/584 |
| 3,616,055 | A | | 10/1971 | Mages | 156/384 |
| 3,617,434 | A | | 11/1971 | Nakafuri | 162/30 |
| 3,671,362 | A | * | 6/1972 | Pierce et al. | 156/552 |
| 3,971,691 | A | * | 7/1976 | Cairns | 156/497 |
| 4,183,143 | A | * | 1/1980 | Root | 33/184.5 |
| 4,339,886 | A | * | 7/1982 | Griffiths et al. | 40/495 |
| 4,574,030 | A | | 3/1986 | Pilcher | 156/522 |
| 4,705,590 | A | | 11/1987 | Vandenberg | 156/447 |
| 4,925,506 | A | | 5/1990 | Baker | 156/64 |
| 5,132,911 | A | | 7/1992 | Leader, Jr. et al. | 364/469 |
| 5,345,868 | A | | 9/1994 | Baker | 101/415 |
| 5,367,953 | A | | 11/1994 | Yamashita et al. | 101/158 |
| 5,676,058 | A | | 10/1997 | Ireton | 101/486 |
| 5,795,435 | A | * | 8/1998 | Waters, Jr. | 156/577 |
| 5,846,175 | A | | 12/1998 | Chen | 492/13 |
| 6,102,096 | A | * | 8/2000 | Johansson et al. | 156/353 |
| 6,284,076 | B1 | * | 9/2001 | Mattson | 156/71 |

* cited by examiner

*Primary Examiner*—J. A. Lorengo
(74) *Attorney, Agent, or Firm*—Randy A. Gregory

(57) ABSTRACT

Apparatus and methods for applying a transfer sheet to sign appliqués and removing them to a sign board or other substrate. A carriage is movably mounted on a layout table. The layout table has a surface upon which appliqués are arranged to be made into a sign. The carriage is constrained to move along the layout table in a fixed orientation, such as by using gear racks mounted on the frame. The carriage may have pinions that are mechanically coupled so opposing sides move in a coordinated manner. A transfer roll support allows the transfer sheet to play out and about an applicator which smooths the sheet onto the sign appliqués. The apparatus includes elevators which allow elevation adjustment between the carriage and layout surface.

48 Claims, 22 Drawing Sheets

SIGN APPLIQUE TRANSFER AND ASSEMBLY APPARATUS

TECHNICAL FIELD

The technical field of this invention is apparatus and methods for using and handling transfer paper, particularly using transfer paper to remove lettering or other appliqués from a carrier paper and apply them accurately onto a display sign substrate.

BACKGROUND OF THE INVENTION

In the sign making industry it is common to have a plotter cut sign making strips in a manner which outlines the letters, numbers or other symbols that need to be presented on the finished sign. This cutting usually is accomplished by placing a two or more ply lettering or other appliqué strip in the plotter. A computer controls the plotter directing the plotter to cut the various characters needed for the sign. This is done by having the plotter cut only through an upper layer or layers of the lettering strip. The plotter does not cut an underlying carrier paper or other carrier layer or layers. This approach allows the carrier layer to support the cut layer in proper spacial relationship to maintain the characters in the desired order and position along the lettering strip.

After the lettering strip has been cut by a plotter or other character cutting device, then it is necessary to remove background portions from the cut layer. This is typically done by hand in a process frequently called "weeding". A worker removes the background portions which are not wanted on the finished sign. What remains is the lettering, numbers or other symbols or characters which are intended to be displayed prominently on the finished sign.

The carrier paper or other carrier layer or layers also facilitate easy handling of the lettering strips after they have been cut and during the weeding process. It further facilitates layout of the lettering strips into an arrangement which forms the text and other items contained in the finished sign.

During layout, the lettering strip or multiple lettering strips are placed on a layout table and arranged into the exact configuration or sign arrangement in which they are to appear on the finished sign. After the lettering strips are laid out in position, then they are subject to being displaced if touched or forced by wind. Thus the lettering strips await transfer to the sign substrate laying upon the layout table in a delicate condition. In this delicate laid-out condition the lettering strips and associated characters are subject to displacement relative to one another and relative to the overall layout pattern of the intended sign.

The next objective is to transfer the laid-out sign characters. This must be done in a way that maintains the desired positions and angular orientations of each individual letter, symbol or other character. Prior to transfer, the characters which are held on any one lettering strip are maintained relative to each other by the carrier paper or other carrier layer. However, if there is more than one lettering strip, then the strips in their laid-out condition can move relative to one another and become displaced both in orientation and/or position.

During the process of transferring the characters, they are removed or lifted from the carrier paper by the transfer paper. The transfer paper has one adhesively coated side that is brought into contact with the appliqués that form the lettering, numbers, characters or other subject matter to be presented on the sign. When the sign is large, then the transfer paper is usually held by two people and tightened between the people to suspend the piece of transfer paper into the air. After achieving this suspended state, it is then moved into position over the layout table. The lettering strips and any other characters must be maintained in the desired positions and orientations on the layout table.

The transfer paper is then lowered onto the lettering strips. Again this must he done without displacing the lettering strips or other characters from their desired positions. The act or process of lowering the transfer paper frequently causes displacement unless care is exercised by both people holding the transfer paper sheet above the layout table.

The transfer paper is lowered onto the lettering strips with the adherent side down. This adherent side typically has an adhesive layer used to stick against the lettering or other characters and temporarily bond them to the transfer paper. The temporary bond formed between the applied transfer paper and the cut characters is a stronger bond than the bond between the cut characters and the carrier paper or other carrier or backing layer, which supports them. This carrier or backing layer has prior to this stage of the process been used to hold groups of the characters together in proper relationship.

Recall that the carrier layer is used to support the upper or cut layer during the cutting process. The carrier layer also supports and retains the desired lettering or other characters during handling to allow removal or weeding of the background portions of the cut layer.

After the transfer paper bas been smoothly engaged against the cut lettering or other characters of the lettering strips, the transfer paper is then raised. This is typically done by hand, again using two people when large, who lift the transfer paper with the adhesively attached lettering or other appliqués.

The transfer paper and attached appliqués are then carefully moved or suspended so that the sign substrate can be positioned to receive the appliqués. This can involve moving the transfer paper and attached appliqués to another table. It can alternatively involve merely lifting the transfer paper and positioning the sign substrate (sign board) under the transfer paper.

The transfer paper and attached appliqués overlying the substrate are then carefully positioned so that the position of the characters is proper upon the substrate. This involves not only carefully positioning the transfer paper and substrate, but also requires that these two parts not be rotated angularly relative to one another or the lettering will run uphill or downhill and be unsatisfactory.

After the characters on the transfer paper are properly positioned, then the transfer paper and appliqués are lowered or otherwise brought into contact with the substrate. The adhesive layer on the back of the appliqués (previously between the appliqués and carrier paper) now is used to adhere the lettering to the substrate. The bonding strength between the substrate and appliqués is greater than the bonding strength between the transfer paper and the appliqués. After fully engaging the appliqués against the sign, the sign maker often rubs or otherwise presses upon the appliqués and toward the sign substrate to increase the appliqué-substrate bond in preparation for removing the transfer paper.

After the lettering or characters formed by the appliqués are sufficiently set on the substrate, then the transfer paper is removed. This is frequently done with large pieces by again having two people grasp the transfer paper and pull it away from the lettering or other appliqués. The lettering is left on the substrate and the substrate and applied lettering or other appliqués form the sign.

Subsequent treatment may also be done to apply protective layers upon the sign and lettering appliqués. This is done to make the sign more durable and prevent displacement of the adhered lettering.

It is an objective of this invention to facilitate the process of transferring sign appliqués using transfer paper. These and other objectives and considerations have been fully or partially addressed by the current invention, which is described in detail below. Some of the benefits and advantages of the current invention will be given in this description. Others will be apparent from the nature of the invention when considered in conjunction with the description given herein. Although effort is made to fully describe various benefits, advantages and principals of operation; some of such information may not be evident, correct, or even available at this time. In the future, additional information may become available or evident after further experience is gained using the invention. The best modes of the invention and various features, advantages and operational aspects now known are described herein.

BRIEF DESCRIPTION OF THE DRAWINGS

Preferred embodiments of the invention are described below with reference to the accompanying drawings, which are briefly described below.

FIGS. 11–25 show a sequence of steps which are described in detail below.

DETAILED DESCRIPTION OF THE PREFERRED EMBODIMENTS

Introduction or Overview

Figure 1:
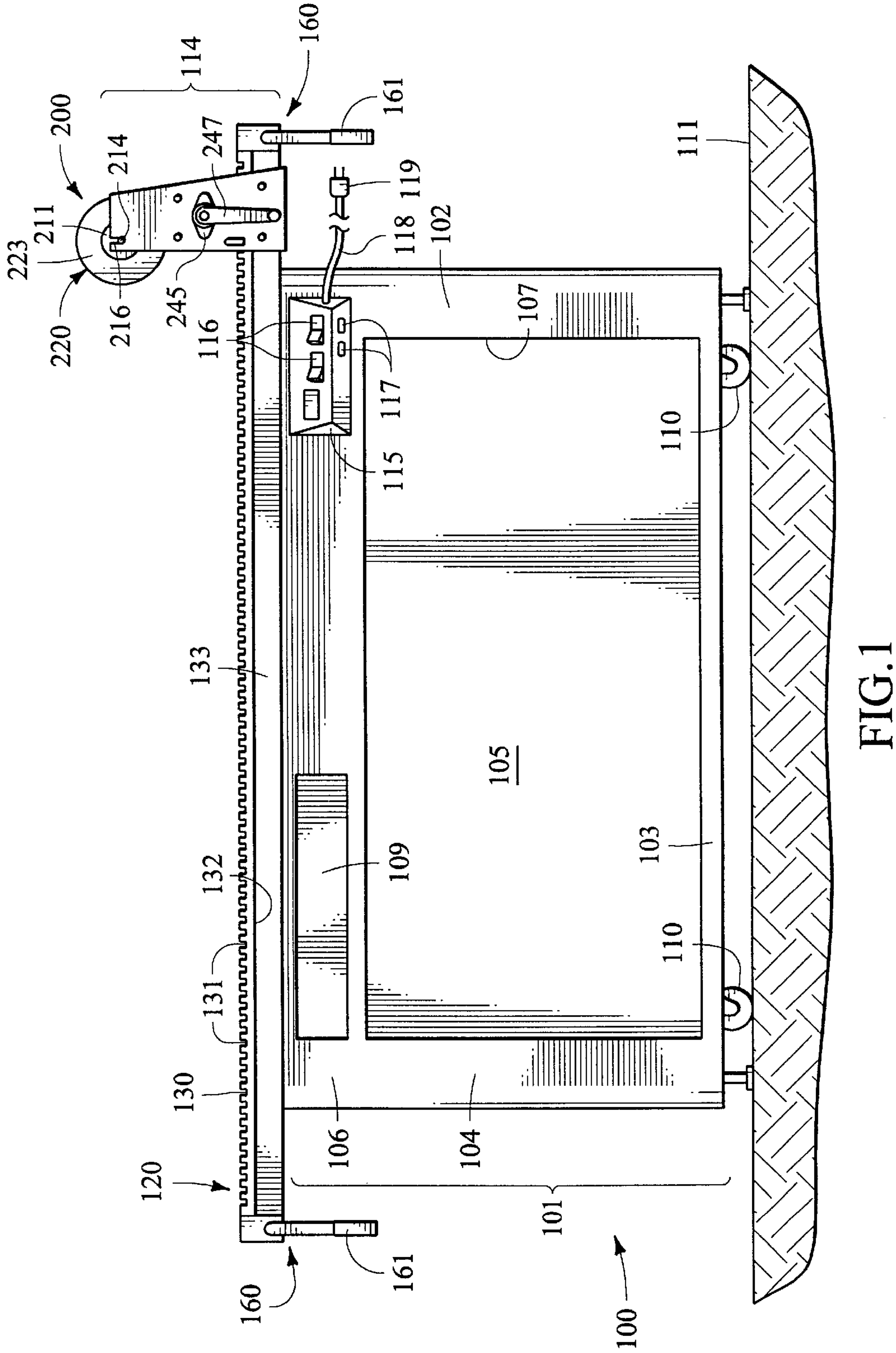
FIG. 1 is a front elevational view of a preferred apparatus according to this invention.

One intent of the present invention is to provide a transfer apparatus which allows lettering, numbering, symbols, figures and other items which can be embodied in a sign appliqué to be more easily transferred from a carrier or backing layer to a sign substrate. It is also intended to make the transfer process more repeatable and accurate. It is also desired to provide an apparatus and methods which conserve transfer paper, such as by using appropriate amounts or by reusing the same transfer paper more than once, as is common today in the industry. Other aspects and benefits of the invention are described herein.

Premise of Specification

Before considering the different embodiments described herein, it is noteworthy that each embodiment may be or has been described using terminology which can vary between different embodiments. However, the writing of this document was premised upon the ability of the writer to utilize terms which may be used in connection with one embodiment or version to also apply to other embodiments for the same or similar structures, functions, features and aspects of the concepts and technology being described. Accordingly, unless specifically indicated otherwise herein, terms from all embodiments are included in this description and are available for describing and defining the technology and exclusive rights being sought.

Apparatus Generally

The present invention is generally shown by the reference numeral 100 in the accompanying drawings. The intent of the present invention is to provide apparatus and methods for utilizing transfer paper more efficiently and economically. It is also the intention to provide apparatus and methods which make use of transfer paper to provide signs in an easier and more reliable manner.

The transfer apparatus 100 will generally include a frame 102 which supports a table assembly 120 thereon. The table assembly supports a carriage 200 which is moveable up and down the table assembly. The height of the carriage relative to an upper layout surface 140 (see FIG. 2) is adjusted using elevators 160 which raise or lower the carriage support with regard to the stationary portions of the top assembly 120.

Base

Transfer apparatus 100 advantageously includes a base 101 which is used to position the top assembly 120 at a suitable working height for a human operator (not shown). Base 101 is preferably made of a metal cabinet having a bottom panel 103, end panels 102 and 104 and upper section 106 which is held between the end pieces 102 and 104. The front of the base cabinet is provided with a storage opening 107 which allows access to a storage compartment contained within the base cabinet. The back side of the base cabinet includes a rear panel wall 105 which is continuous to help stabilize the base cabinet and act as a back stop to materials inserted through the front opening 107.

The base cabinet can be made using sheet metal components which are suitably formed, such as shown in order to provide a base frame work. Alternatively, the base cabinet may have an alternative structure or additional structural support provided by an internal frame work (not shown).

FIG. 1 also shows that the base cabinet 101 can be supported upon casters 110 which allow the transfer apparatus to be relocated on supporting surface 111 as desired.

Figure 2:
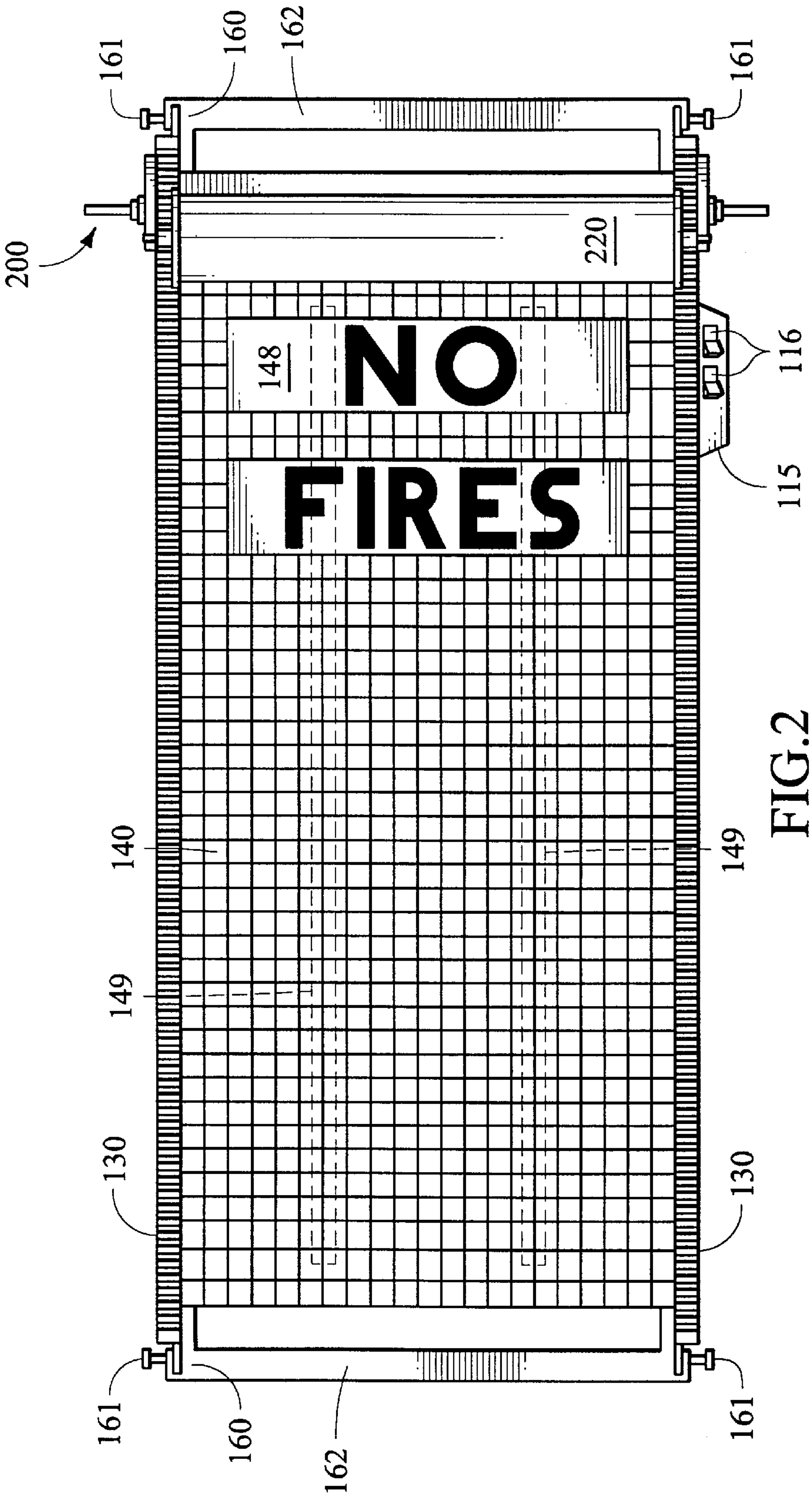
FIG. 2 is a top view of the apparatus of FIG. 1.
Figure 3:
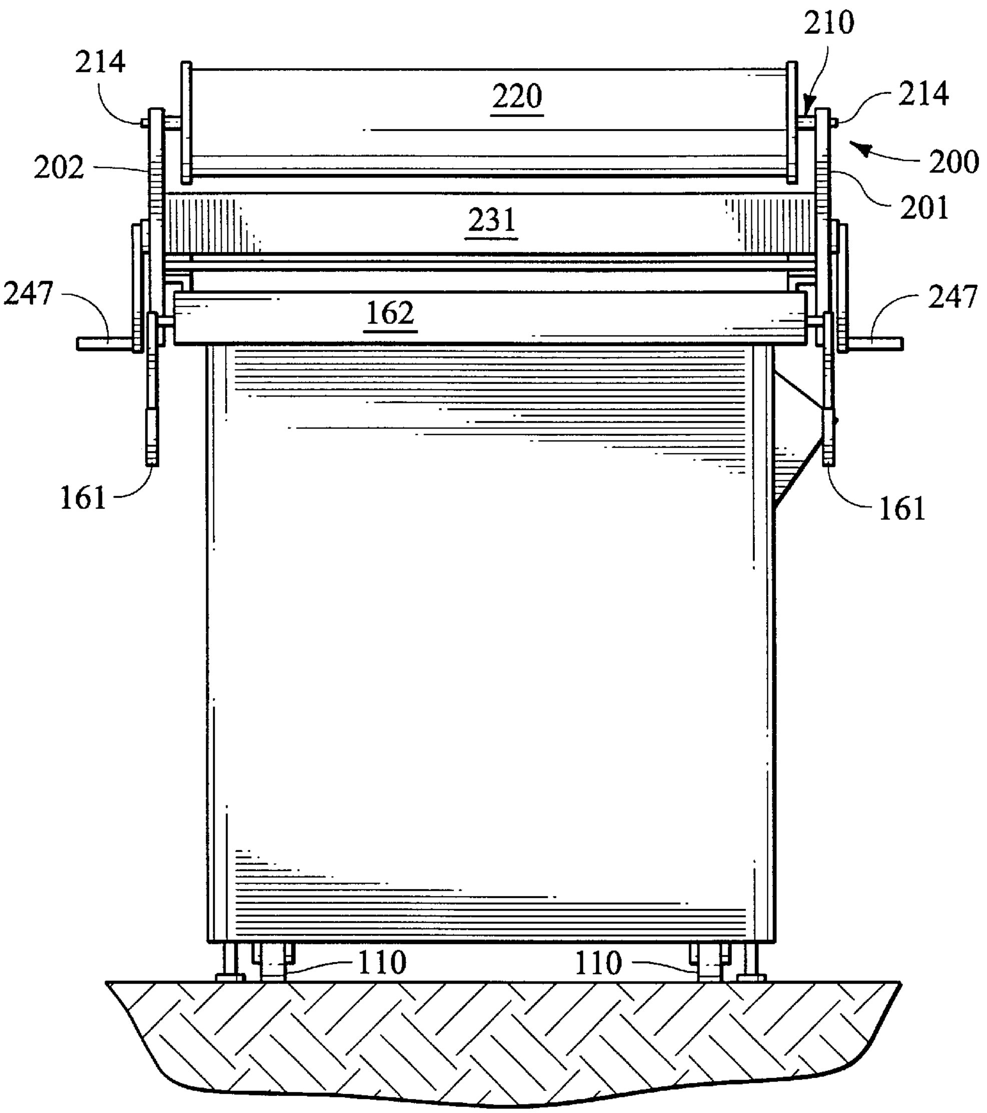
FIG. 3 is a right end view of the apparatus of FIG. 1.

The base cabinet 101 is also preferably provided with a control box 115 having two light switches 116 which are used to control two light tubes 149 (FIG. 2). The lights controlled by switches 116 provide illumination below the top assembly to form a light table upon which a person works when utilizing the transfer apparatus.

The electrical control 115 may be provided with power via an electrical connection cord 118 having a suitable electrical plug 119. It may also be desirable to include two additional electrical receptacles 117 on the electrical control box in order to provide easy access if some additional electrical device is needed in connection with use or repair of the transfer apparatus. FIG. 1 also shows that the electrical control may include a ground fault indicator near the switches 116.

The base cabinet can also advantageously be provided with an outboard utility tray 109 which is optional and only shown in FIG. 1. This can conveniently be used to store pencils, adhesive tape, squeegees or other hand tools used in performing the processes described herein.

Top Assembly

The transfer apparatus also includes a top assembly 120. The top assembly includes portions which are stationary relative to the cabinet base and it also includes portions which are moveable with respect thereto. The main portion of the tabletop is stationary. This is represented in FIG. 2 by the working top 140 which acts as a layout panel having an upper layout surface thereon. The upper layout surface is preferably provided with a rectilinear grid illustrated in FIG. 2 to allow easier alignment of lettering strips 148. The stationary portions of the top assembly 120 also include end extensions 162 which are brackets that extend outwardly from the main part of the tabletop. Brackets 162 support elevators 160. Elevators 160 are controllable using handles 161 to raise and lower a carriage support 130.

Carriage Support

The carriage support 130 is provided with guide bars 133 (FIG. 1). The guide bars 133 are advantageously provided with an overhang 132 along the outer faces of the guide bars. The overhang 132 allows more secure engagement and tracking of the carriage assembly 200 which is supported on the guide track 133.

Carriage support 130 also is preferably provided with coordination features such as gear teeth 131 which form a gear rack along the upper surface of the guide bars 133. The gear teeth or other coordinating features included on the guide track allow the carriage assembly to be advanced left and right as shown in FIG. 1 in a linear fashion with opposing sides of the carriage assembly advanced equal amounts.

Carriage Assembly

Figure 7:
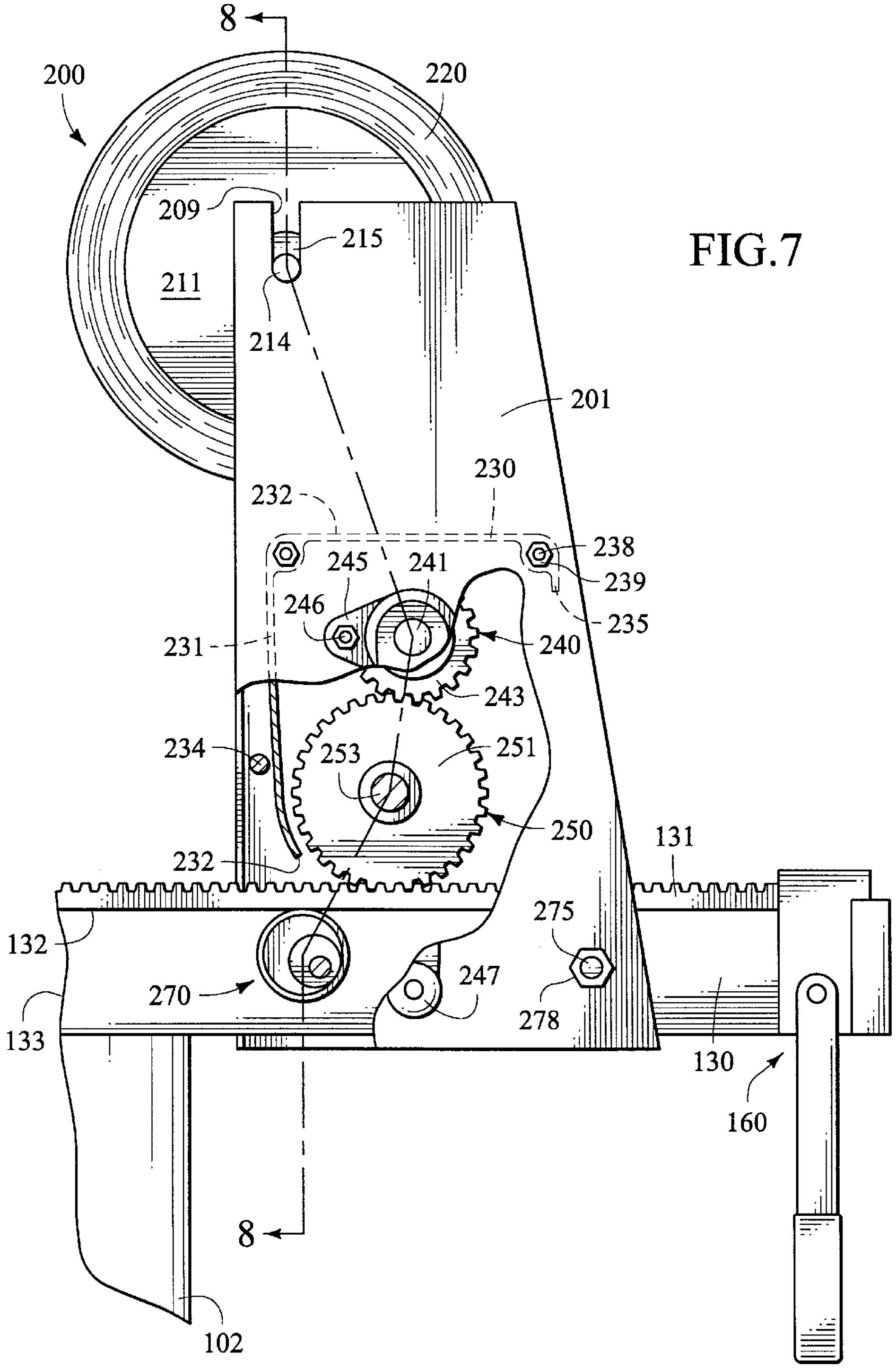
FIG. 7 is an enlarged partial front view showing the carriage and other portion of the apparatus of FIG. 1 in greater detail. Portions have been removed to reveal internal components.
Figure 8:
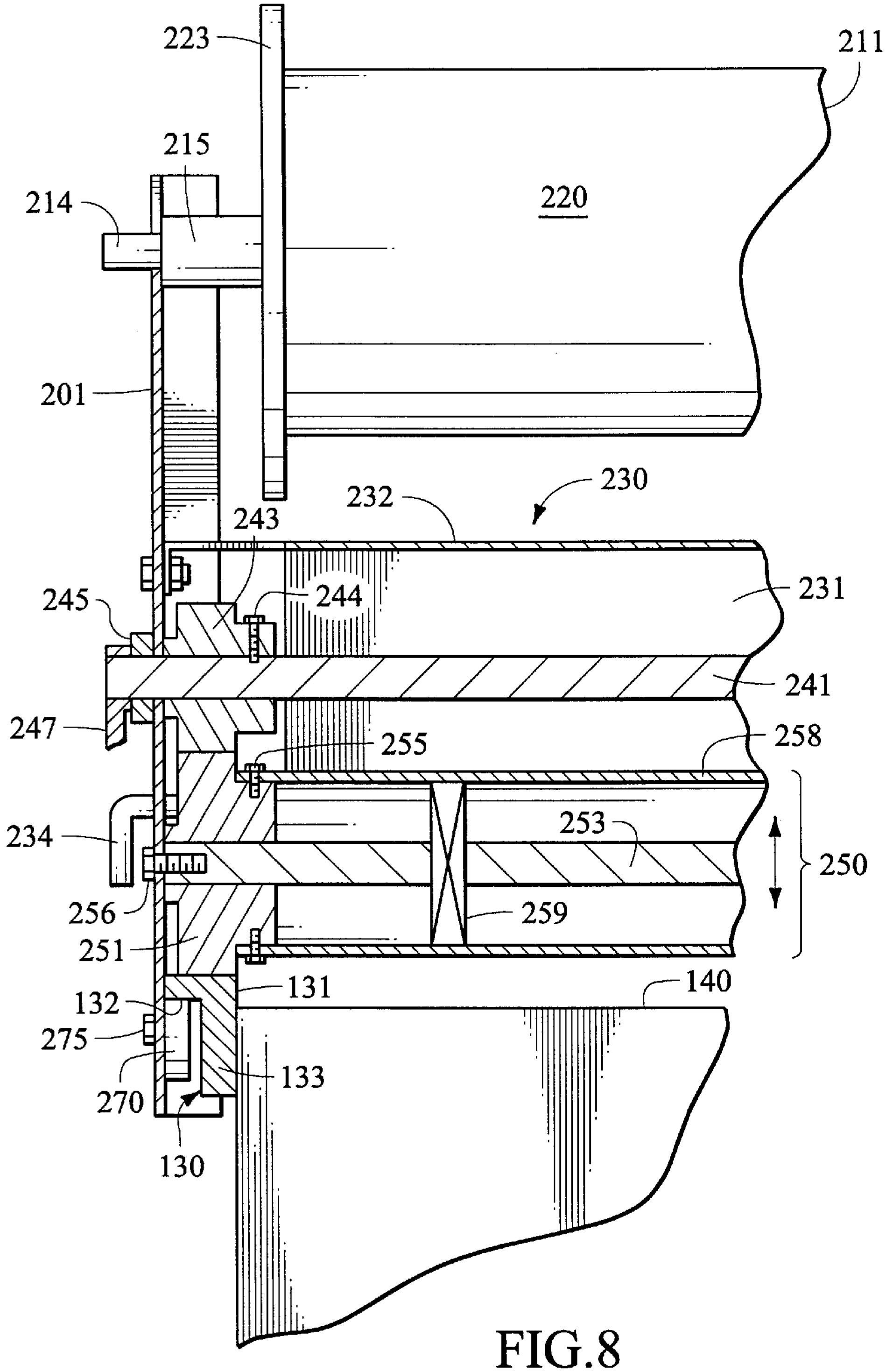
FIG. 8 is a sectional view taken along line 8—8 of FIG. 7.

FIGS. 7 and 8 better show details of the carriage assembly 200 which is moveable along the layout surface in a carefully tracking and repeatable positioning arrangement. The carriage assembly includes a carriage framework. The carriage framework includes front and rear end plates 201 and 202. Carriage end plates 201 and 202 are suitably connected by intermediate frame pieces which span between and structurally space the end pieces. As shown, the end pieces 201 and 202 are spaced and supported by an intermediate frame piece 230 which is secured to each frame piece at the ends thereof using fasteners 238 which extend through apertures in the end pieces. Complimentary fastening parts such as nuts 239 thread onto the fastener stems 238 and hold the carriage frame assembly together. Additional transverse support is provided by other elements of the carriage assembly. One such additional element is rod 234 which acts both as a spacer and as part of an applicator guide which facilitates smooth action of the transfer paper as it is being laid onto the layout surface.

Transfer Roll Support

The carriage assembly 200 preferably includes a transfer roll support 220. Transfer roll support can be built and arranged in various configurations. As shown, the transfer roll support includes two notches 209 which are cut into the upper portions of carriage frame end pieces 201 and 202 in complimentary positions. The receptacle slots 209 serve to receive a roll spindle assembly. The roll spindle assembly can simply be lifted from the carriage end pieces by grasping the roll assembly and lifting it upwards to withdraw it from receptacles 209.

The spindle assembly includes a shaft 215 which has a shoulder which steps down to a small end stub 214 at each end. The shoulder produced between these two sections of the shaft provide positive lateral positioning of the spindle assembly between the carriage end pieces. Shaft 215 mounts roll tube 211 which supports a roll of transfer sheet material 220, such as transfer paper or transfer plastic.

FIG. 8 shows that the spindle assembly can also include a hand wheel 223 which is larder than the transfer paper roll 220 to facilitate easy manual tensioning and operation of the spindle assembly.

It should be appreciated that the spindle assembly is free to rotate upon the journals forming part of shaft end stubs 214 as received in the journal bearing areas formed at the semicircular bottom end of receptacles 209.

Carriage Drive

In order to maintain the carriage in a consistently perpendicular transverse orientation, it is desirable to have the carriage driven by a positive carriage drive mechanism. As shown, carriage drive 250 includes a crank handle 247 (also see FIG. 1). Crank handle 247 is used to rotate an upper shaft 241. Upper shaft 241 is rotatably supported using bearing fixtures 245 which are secured to the end pieces using fasteners 246.

The drive mechanism also includes a pair of crank shaft gears 243 which are positioned along the inside faces of end pieces 201 and 202. As FIG. 8 illustrates, the crank shaft gears 243 are non-rotatably connected to the crank shaft 241 using set screws 244. The two opposing crank shaft gears 243 rotate in unison. Rotation of these gears and the connecting shaft is most conveniently provided by utilizing the hand crank 247. Alternatively, it is possible to push upon the carriage assembly and provide some travel of the carriage along the carriage support.

The carriage drive also advantageously utilizes gears 251 which are mounted on opposing ends of applicator assembly 250. Gears 251 are rotatably mounted upon the carriage frame work. This can be done in various ways. In the preferred construction shown, gears 251 also form part of an applicator which is used to smooth transfer paper onto the layout surface.

Gears 251 mesh with crank shaft gears 243. Gears 251 also preferably mesh with the carriage support tracks 133 using the gear rack teeth 131. The connection via shaft 241, gears 243, gears 251, and coordinately positioned gear racks 131 provide for positive coordinated positioning of each side of the carriage when it is driven up and down the carriage support rails 133.

Carriage Tracking

The carriage assembly is connected to the carriage support tracks in a manner which provides reliable orientation of the carriage relative to the layout surface. This is advantageously accomplished using tracking rollers 270 which bear upon the track ledge 132. The tracking roller assemblies 270 are secured in position using apertures formed in the carriage end pieces 201 and 202. Fasteners 275 extend through the end pieces and roller assemblies 270 and are secured to the end pieces using fastening nuts 278.

Figure 9:
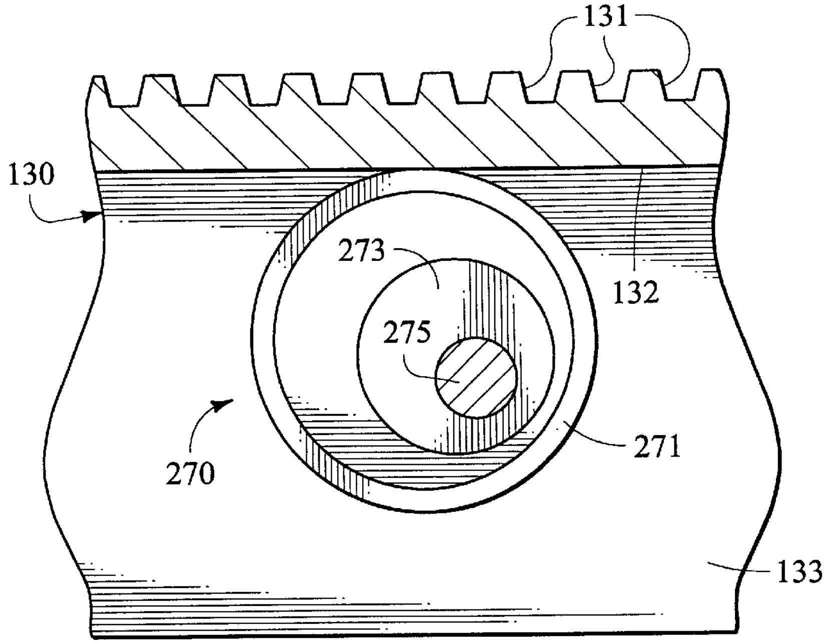
FIG. 9 is an enlarged detail view of a preferred guide roller and adjacent guide track.
Figure 10:
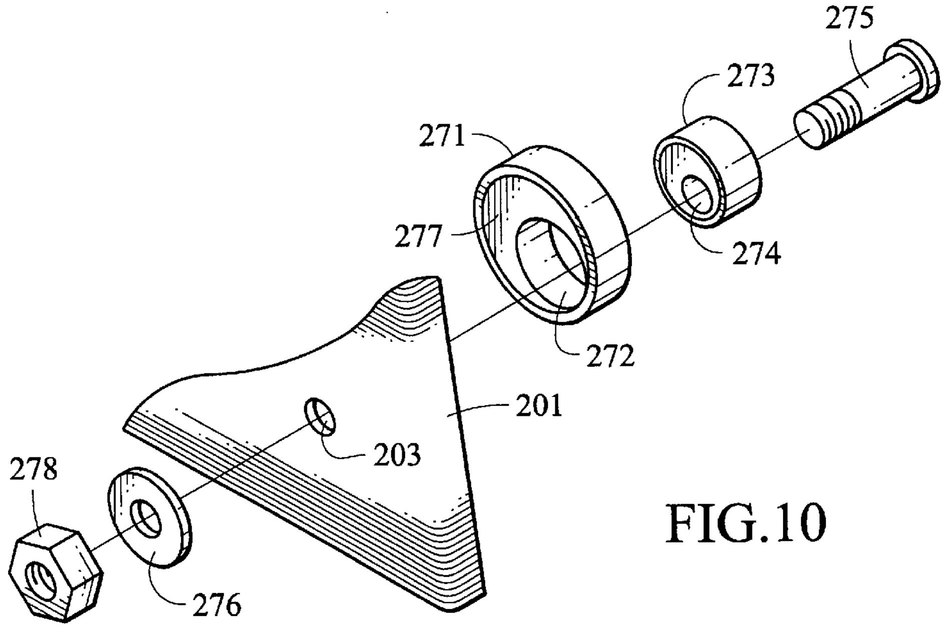
FIG. 10 is an exploded isometric view of the guide roller assembly of FIG. 9.

FIGS. 9 and 10 show in greater detail the preferred construction of the carriage tracking roller assemblies relative to guide tracks 133.

Tracking roller assemblies 270 include a first part 271 which includes an outer race which is rotatable relative to the inner part 277. Inner part 277 is fitted with a receptacle hole 272 which extends therethrough. Receptacle hole 272 is preferably positioned acentric with regard to the rotatable outer race of part 271.

The preferred tracking roller assemblies also include a second cylindrical part 273 similarly constructed to part 271 but having an outer diameter which allows the piece to be installed within hole 272. The receiving hole 274 is also preferably acentric with respect to the outer race of second piece 273. Bolt 275 extends through hole 274 which fits within hole 273. The conjoined roller pieces 271 and 273 are inner positioned and secured to the end frame 201 using mounting hole 203, washer 276, and fastening nut 278 which retains the roller assembly against the inside surface of the end piece.

This construction for roller assemblies 270 allow the carriage to track in a tightly held position as best illustrated in FIG. 7. The eccentric parts allow adjustment to achieve tracking and to eliminate so any lash between gear 251 and gear rack 131.

There are four roller assemblies 270. Two along each end piece positioned so as to engage and roll upon the underside surface formed at ledge 132.

Applicator

FIGS. 7 and 8 also illustrate an applicator assembly 250 which is driven by gears 251 at each end and is used to roll along the layout surface 140 to act as a roll press aiding in adherence of the transfer paper onto the sign appliqués. The construction of this contact roller can be accomplished in a number of different ways. A preferred way of accomplishing this is shown in FIG. 8. Gears 251 are mated with an intermediate tube 258 which spaces between and is securely affixed to the gears 251 to provide mechanical coordination there between. Rotational support is provided near each side utilizing a bearing 259. The outer race of bearing 259 is secured along the inside diameter of tube 258. The inner race of bearing 259 is mounted upon a transverse stationary support shaft 253. Support shaft 253 is secured to end pieces 201 and 202 using a suitable means such as fasteners 256 which extend through an appropriately placed aperture in the end plates and into a threaded receptacle formed at each end of transverse shaft or bar 253.

This construction allows the supported tube 258 and attached gears 251 to rotate in unison. The outer surface of 258 can be brought to bear on the layout surface 140 utilizing height adjusting elevators which will be described below.

Elevator Mechanism

Figure 6:
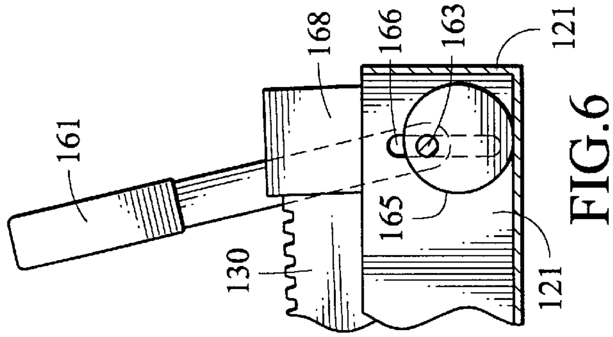
FIG. 6 is a view similar to FIG. 5 with a handle moved to a different position.
Figure 5:
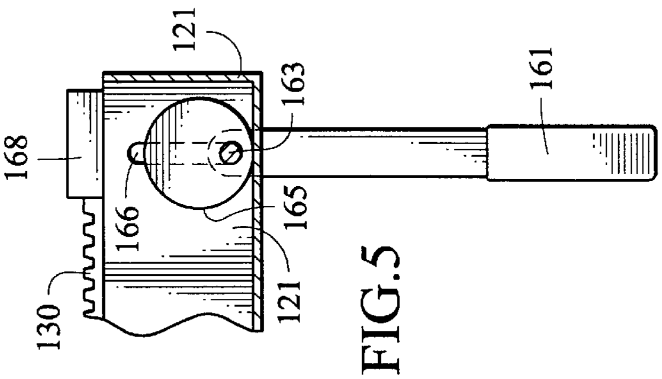
FIG. 5 is an enlarged detailed side view of the elevation mechanism of FIG. 4.
Figure 4:
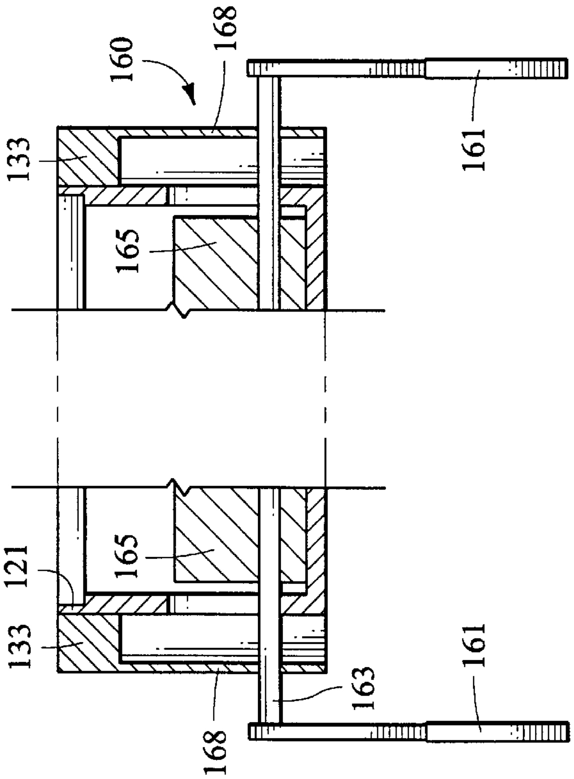
FIG. 4 is an isolated detail view showing an elevator mechanism advantageously used in the apparatus of FIG. 1.

FIGS. 4–6 show details of a preferred construction for the elevators 160. Elevators 160 include a pair of handles 161 which are non-rotatably attached to an elevator pivot rod 163. A cylindrical cam piece 165 is welded or otherwise attached securely to the pivot rod 163. When the handles are raised the protruding lobe of the cam 165 bears against the table frame 121 and causes the pivot rod to move upwardly within the retaining slots 166 formed in the table frame 121.

The pivot rod 163 is also mounted within an elevator end piece 168. The elevator end piece is connected to the guide track 133. Thus the guide track and associated gear rack are raised and lowered at one end. The opposite end of the apparatus is fitted with another or second elevator which allows adjustment at each end of the lay-out table surface 140. This allows the applicator to be adjusted to a suitable height to apply the correct pressure or force between the applicator, transfer layer, lay-out surface and any appliqués supported thereon.

Methods, Operation and Manner of Use

The invention also includes novel methods and such methods and related operation and use of the invention will now be given. Operation of the present invention may be partially or fully understood from the above description. Added description will now be given reiterating or detailing the same or further aspects of the invention. Such may be taken in combination with the other description given herein. The various methods, procedures and operating capabilities described with regard to one, more than one, or all embodiments can be individually or in combination added to or used to modify this description and may be further exemplary of additional forms and embodiments of this invention.

FIGS. 11–25 show a sequence of similar front views of portions of the transfer apparatus 100. These views illustrate aspects of preferred methods and the preferred manner of operation described below or elsewhere herein.

In one aspect the methods according to this invention may including cutting one or more sign appliqués in an appliqué strip or other sheet. The appliqué sheet material is preferably a two or more layer material with a backing or carrier layer and an appliqué layer which is cut to form various letters, numbers, symbols or other appliqués. This step is not illustrated.

In another aspect the preferred methods and operation include laying out the appliqués onto a lay-out surface, such as surface 140. The appliqués are laid out so as to form a sign arrangement which is the same or similar to a sign being made. FIG. 2 shows sign appliqués on the lay-out surface.

Operation and methods in accordance herewith also preferably include loading a roll of transfer sheet material onto a movable carriage. This is done by installing the roll upon the roll spindle after removing the spindle from the receptacles in the carriage in which the spindle rests.

Figure 11:
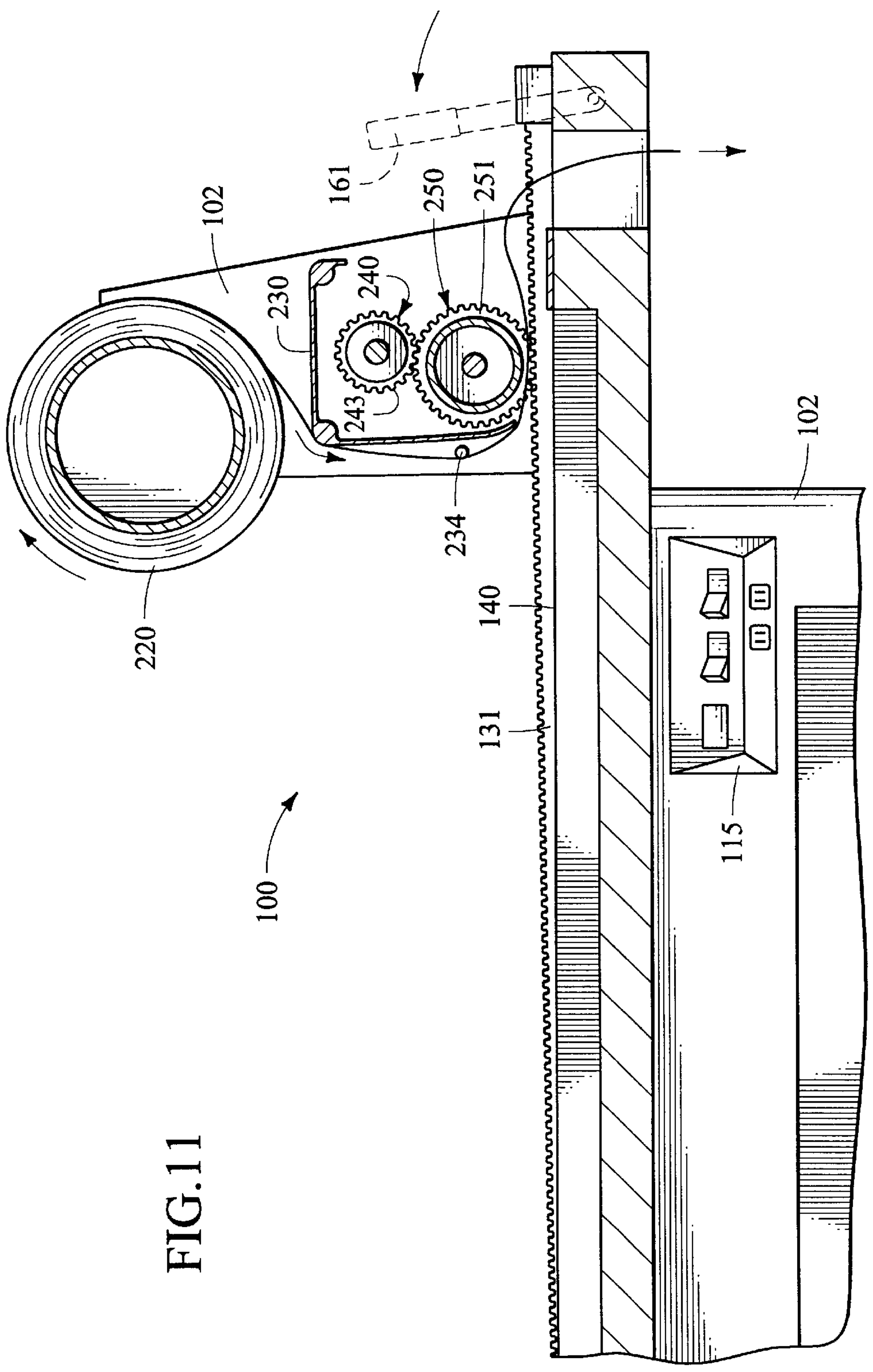
FIGS. 11–25 are partial front elevational views showing an operational method which can be practiced using the apparatus of FIG. 1.

FIG. 11 shows that the methods can also include training or feeding the transfer sheet from the roll beneath the carriage in preparation for applying the transfer sheet to the lay-out surface and any appliqués present thereon. The training is preferably between an applicator and the lay-out surface. To facilitate this the elevator arm 161 is raised and the gear rack and attached track are also raised.

Figure 12:
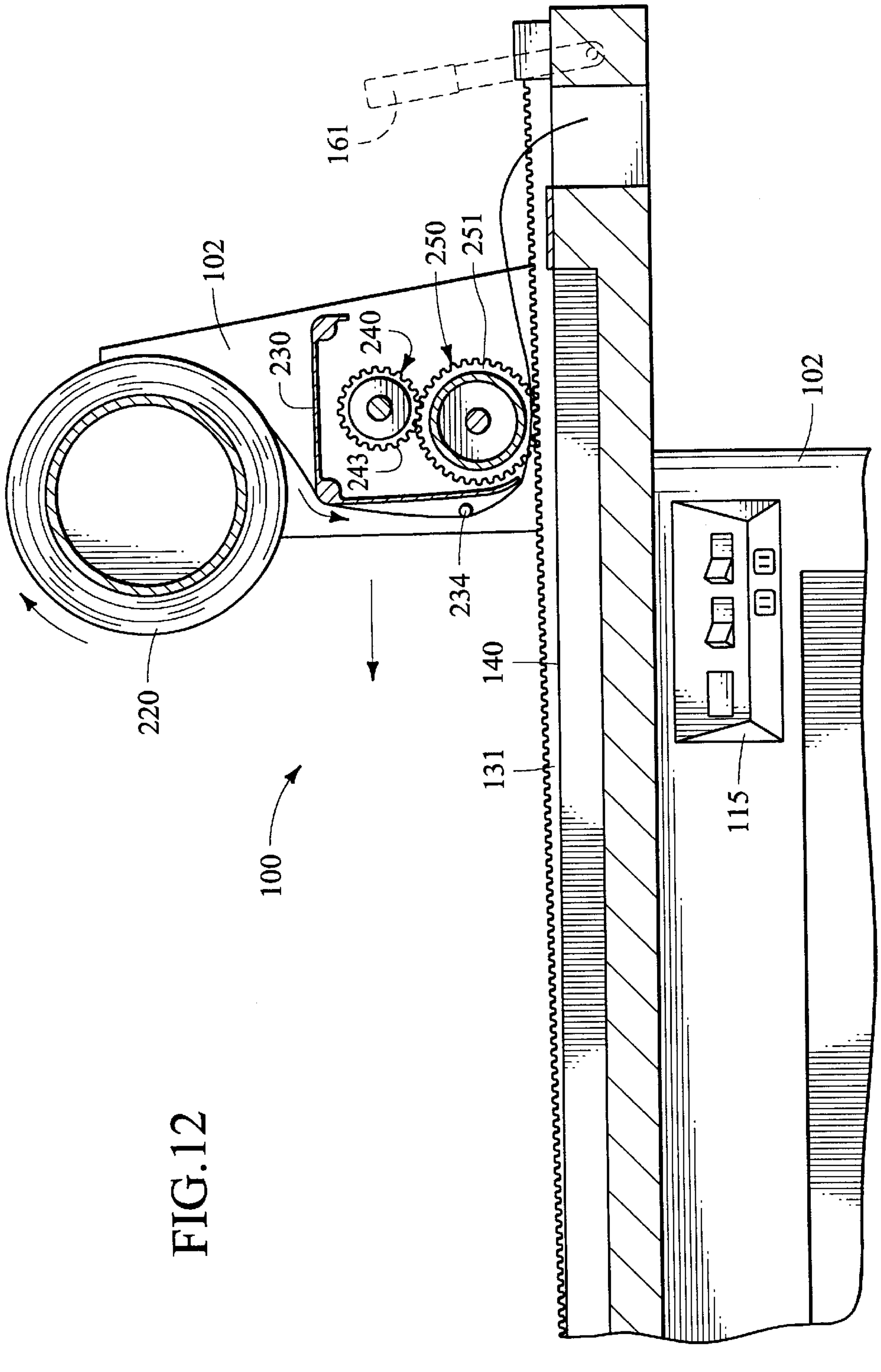

FIG. 12 shows that the training and feeding of the transfer paper can be facilitated by moving the carriage along the lay-out table. It also shows that the roll of transfer paper can be manually played or fed by turning the roll, such as at the roll handle described above.

Figure 13:
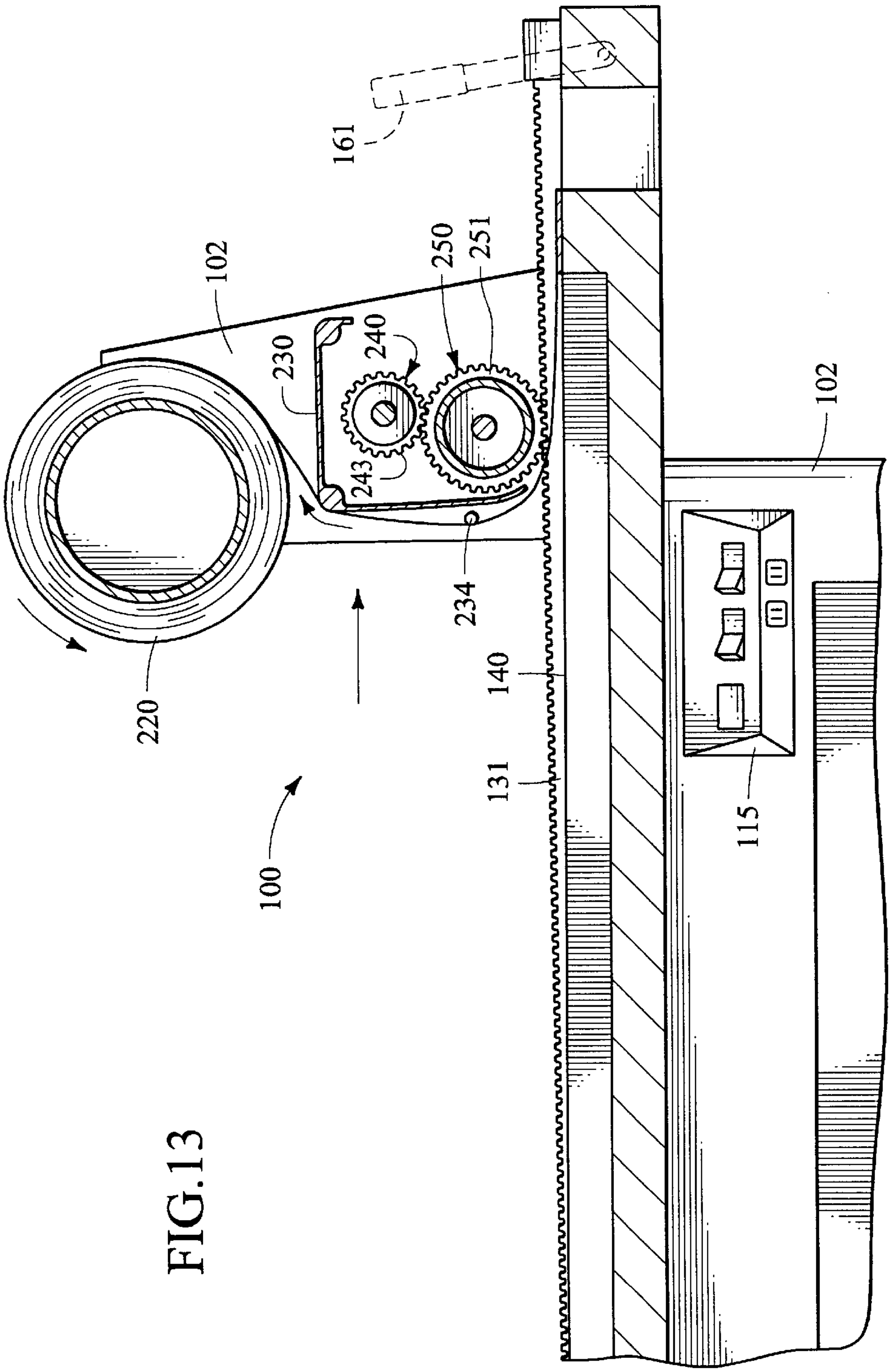

FIG. 13 shows that operation also typically involves securing the end of the transfer sheet to the lay-out table. This can be done in a number of ways, such as with a retainer device or more simply by using the adherent qualities of the transfer sleet and sticking it to the lay-out table at an appropriate location. The elevator is still in the up position.

Figure 14:
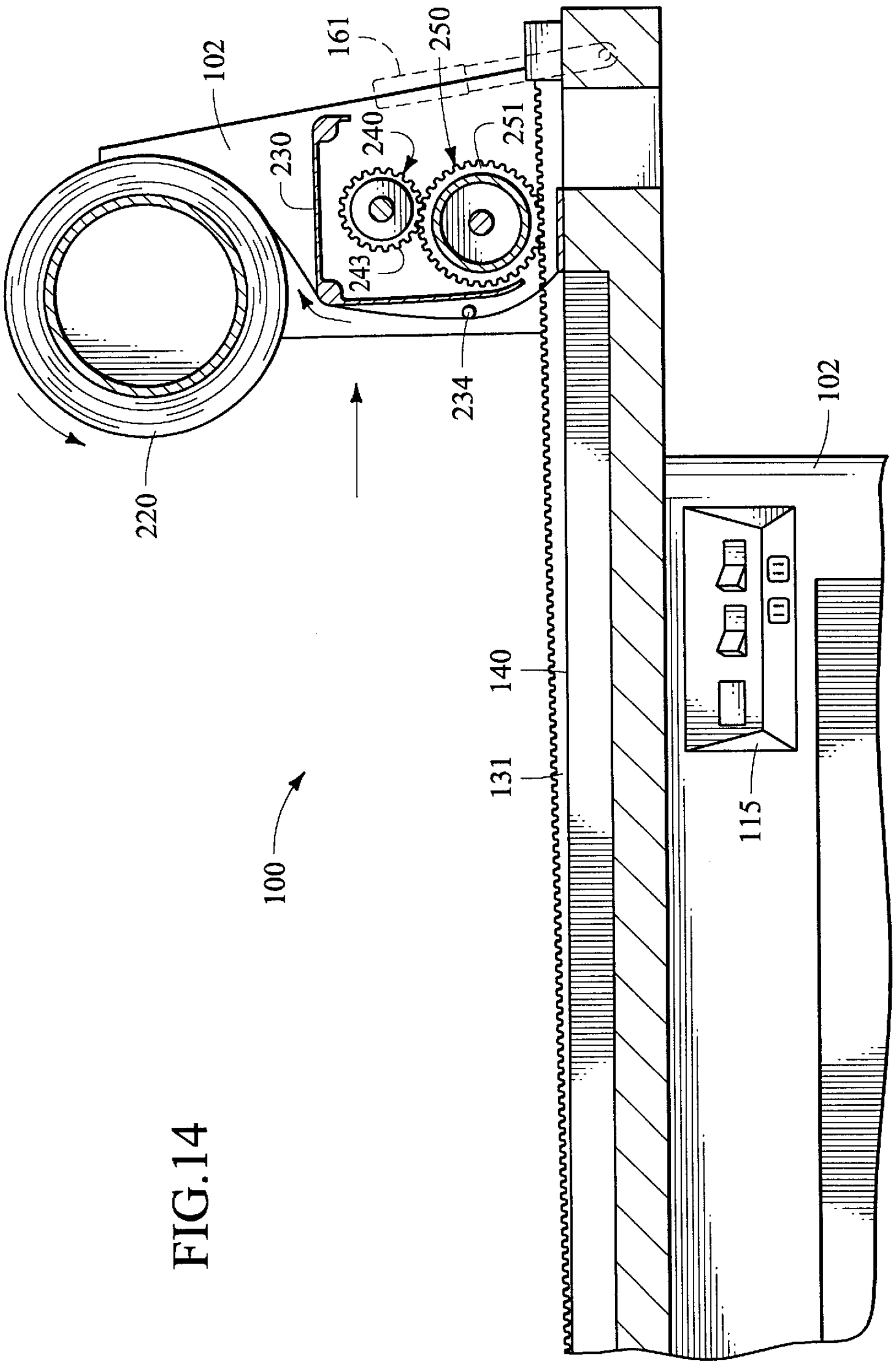

FIG. 14 shows the carriage moved back to the end of the table and the transfer paper is tightened by hand using the roll.

Figure 15:
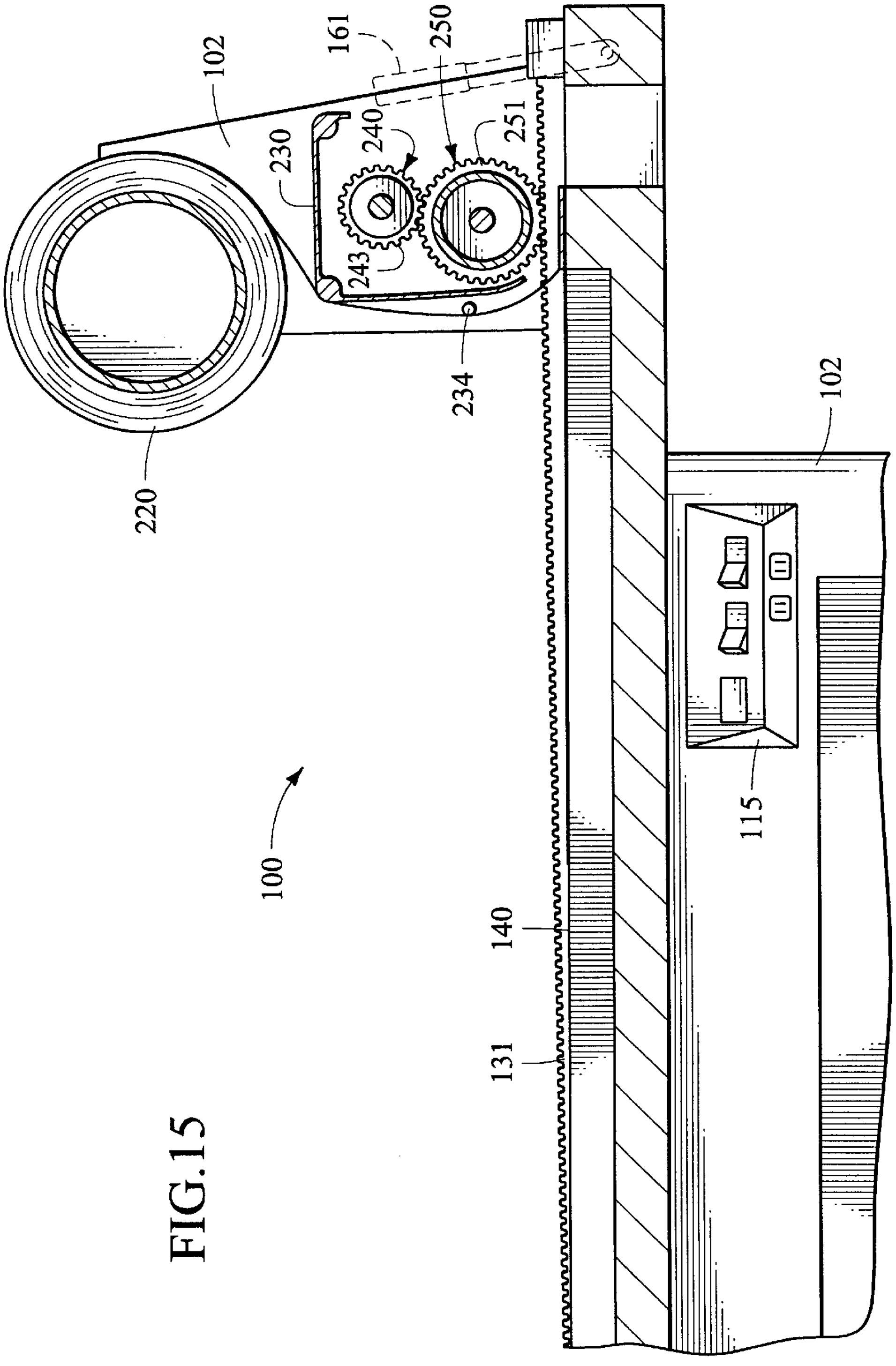

FIG. 15 shows the carriage in a retracted position and the lettering strips have been installed upon the lay-out surface. The elevator is still in the raised condition.

Figure 16:
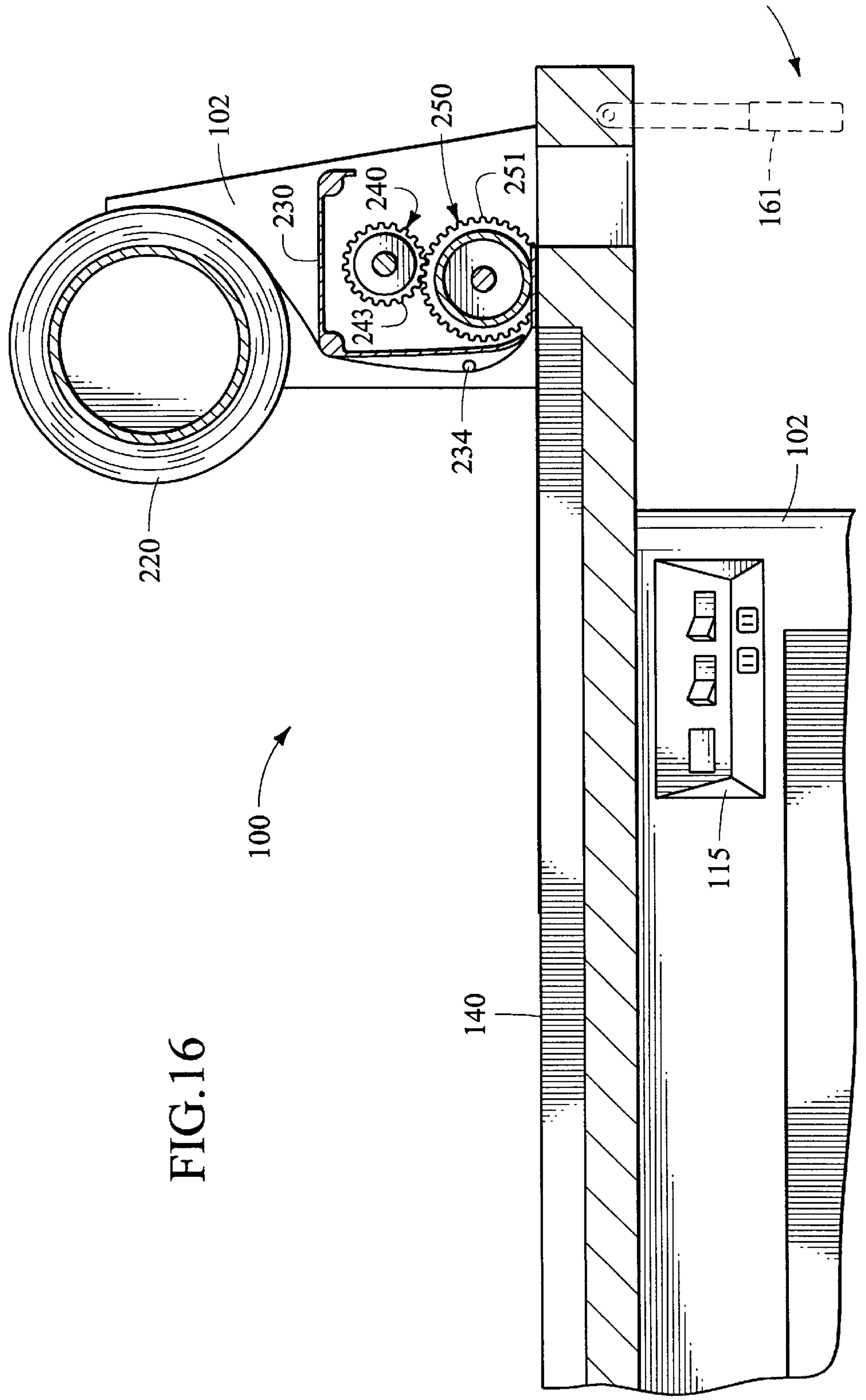

FIG. 16 shows the elevator lowered into an engaging position with the applicator at the level of the lay-out surface.

Figure 17:
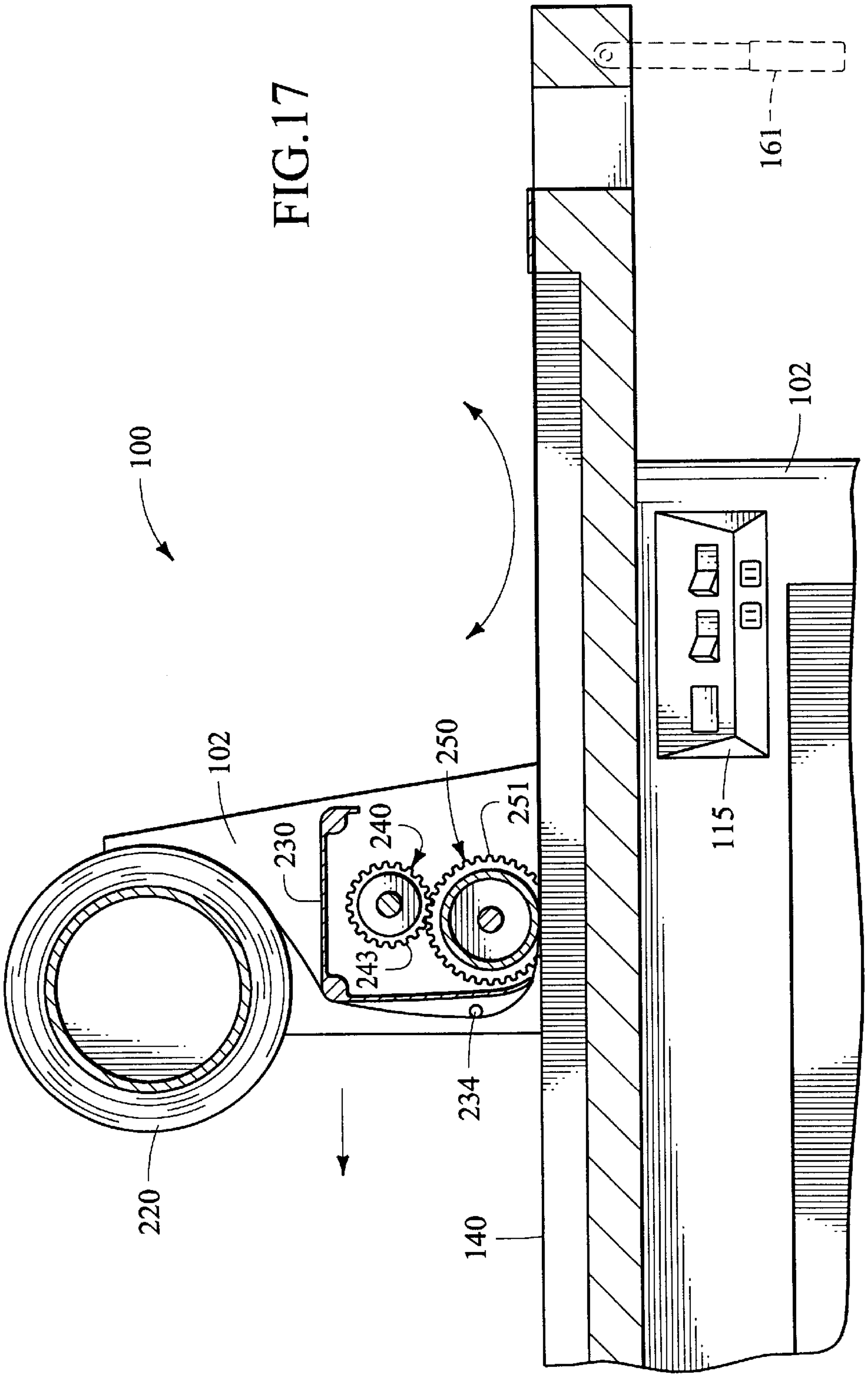

FIG. 17 shows preferred methods also include moving the carriage over at least portions of the lay-out surface. This preferably done after lowering the elevator and carriage as illustrated in FIG. 16. This phase also preferably involves unrolling the transfer sheet from the roll as the carriage moves. The movement of the carriage is in a first direction that cause the transfer sheet to unroll. This unrolling action is facilitated by causing the carriage to move in a manner which is constrained or guided to be directly along the lay-out table. The constraining or guiding is explained herein above with regard to the apparatus 100.

The moving of the carriage and any associated unrolling can best be accomplished by driving the carriage in an orientation which is consistent and transverse to the lay-out table and direction of movement. Preferably, the orientation will be perpendicular to the line of movement. The driving can be done in apparatus 100 using the crank handle 247 which is turned to move the carriage.

The methods also include applying the transfer sheet to the lay-out surface. This is advantageously done by passing an applicator against the transfer sheet. The applicator preferably engages the transfer sheet along the surface opposite to the adherent surface. The applicator impressed the transfer sheet against the lay-out surface and any appliqués present thereon.

Either prior to, during or after the moving begins, the methods can also include adjusting the height of the carriage, in particular the elevation of the applicator. This is advantageously done using the elevators described hereinabove or a similarly functioning structure. The adjusting or elevating step or steps are used to provide the correct pressure between the applicator, transfer paper, lay-out table and any supported appliqués present thereon.

The applying step is also preferably accomplished by rolling an applicator roll against the non-adherent surface of the transfer sheet to effect a pressing or impressing of the transfer sheet adherent surface against the lay-out surface and any sign appliqués positioned thereon. The rolling of the applicator can advantageously be done so that the applicator roll is rolled at an angular velocity which produced at the periphery of the applicator roll a velocity which is the same or nearly matches the velocity of the carriage. This is preferably done by actively driving the applicator roller so that it rolls smoothly over the lay-out surface and presses the transfer sheet adherent surface against the appliqués.

Methods according hereto also preferably include smoothing the transfer sheet against the appliqués. This can be done in a common fashion using a small straight edge which is manually moved over the transfer sheet non-adherent surface. This results in adhering the transfer sheet to the laid out appliqués. The bonding which occurs is more adherent between the transfer paper and appliqués than is the bonding between the appliqués and the carrier or backup paper on which they were cut or otherwise formed. Methods according to the invention may also include hand rubbing the transfer sheet against the appliqués.

Figure 18:
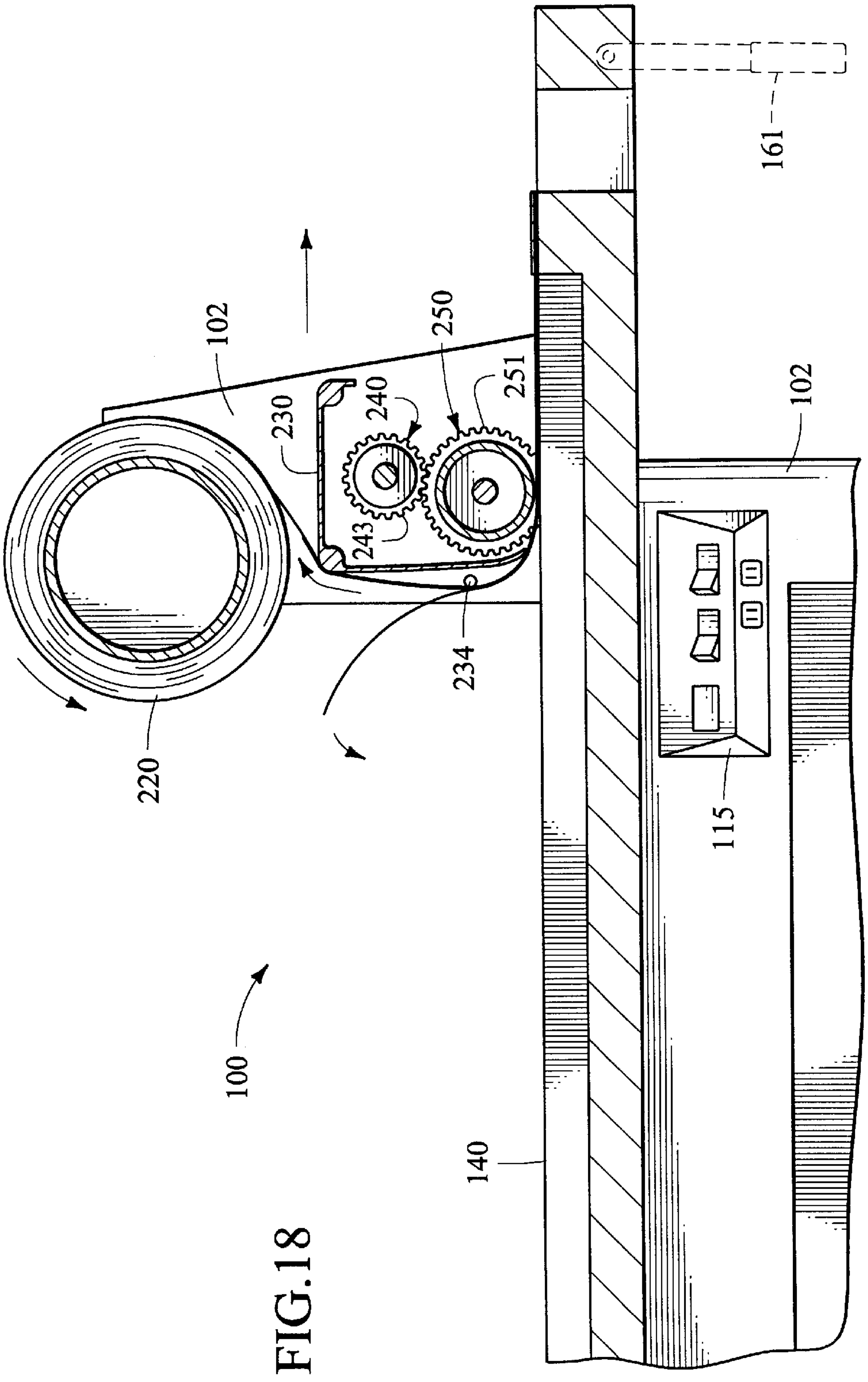

FIG. 18 shows that methods according hereto may include re-rolling the transfer paper and adhered appliqués. This is preferably done by moving the carriage in a second direction which is opposite to the first direction. This can be done by driving the carriage in a manner opposite to that described above relative to the first direction. During the re-rolling action, the appliqués and backing paper are typically wound upon the transfer sheet roll. The backing paper can also be removed by peeling it away as illustrated in FIG. 18.

The re-rolling step just described can be performed in the lowered position or after first elevating the carriage and/or applicator upwardly or away from the lay-out surface. This helps to reduce or remove the application pressure when it is not needed or needs to be reduced.

FIG. 18 illustrates that methods hereto also can involve removing the appliqués from the backing or carrier paper. This can be done manually by grasping the carrier paper as the transfer paper and appliqués are re-rolled. Alternatively, the carrier layer may be retained on the lay-out surface in some suitable manner.

Figure 19:
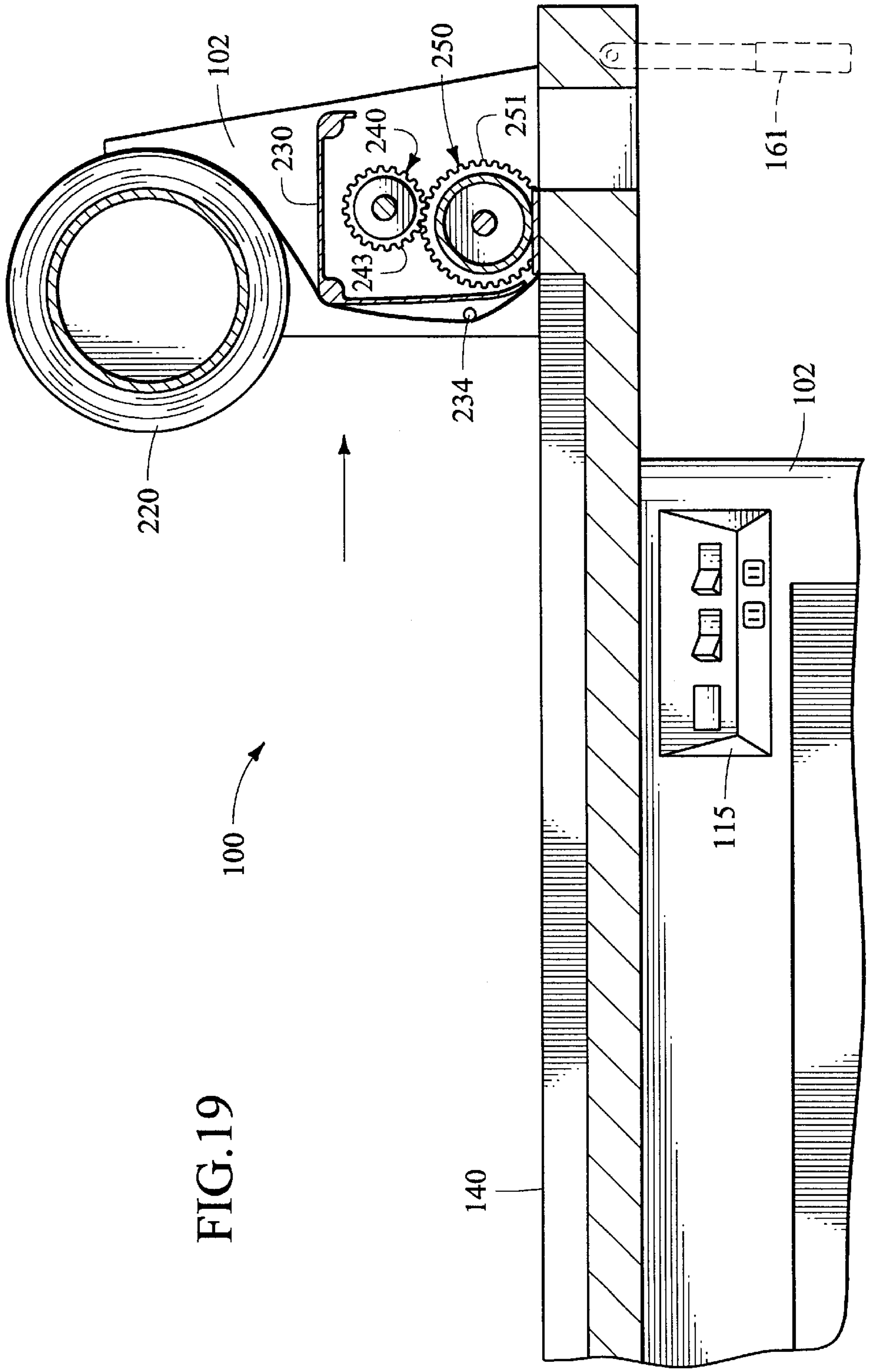
Figure 20:
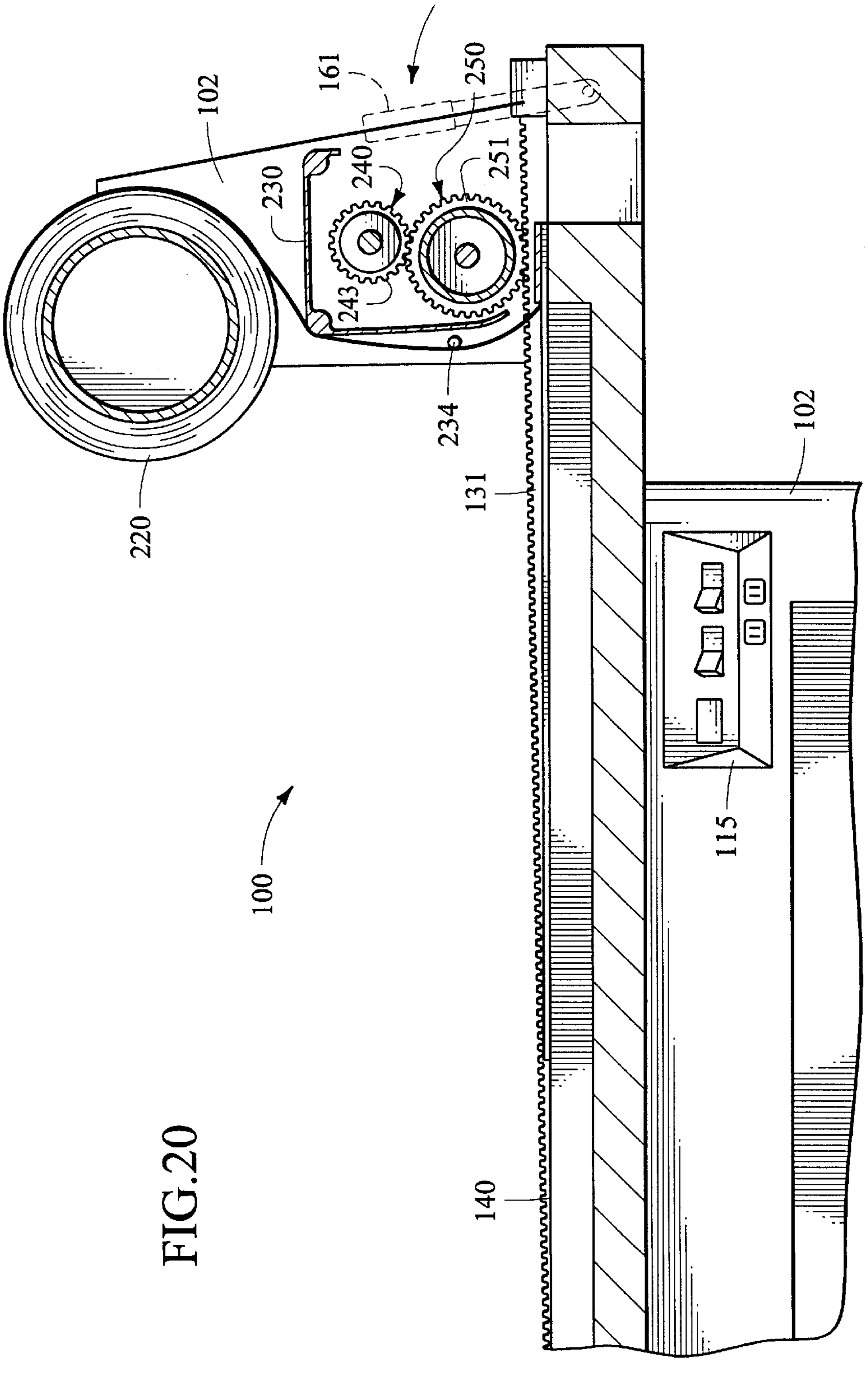

Methods according to the invention may also include applying the appliqués to a sign substrate. This may first involve positioning the carriage in the fully retracted position as shown in FIG. 19. FIG. 20 shows the carriage raised into the elevated position.

Figure 21:
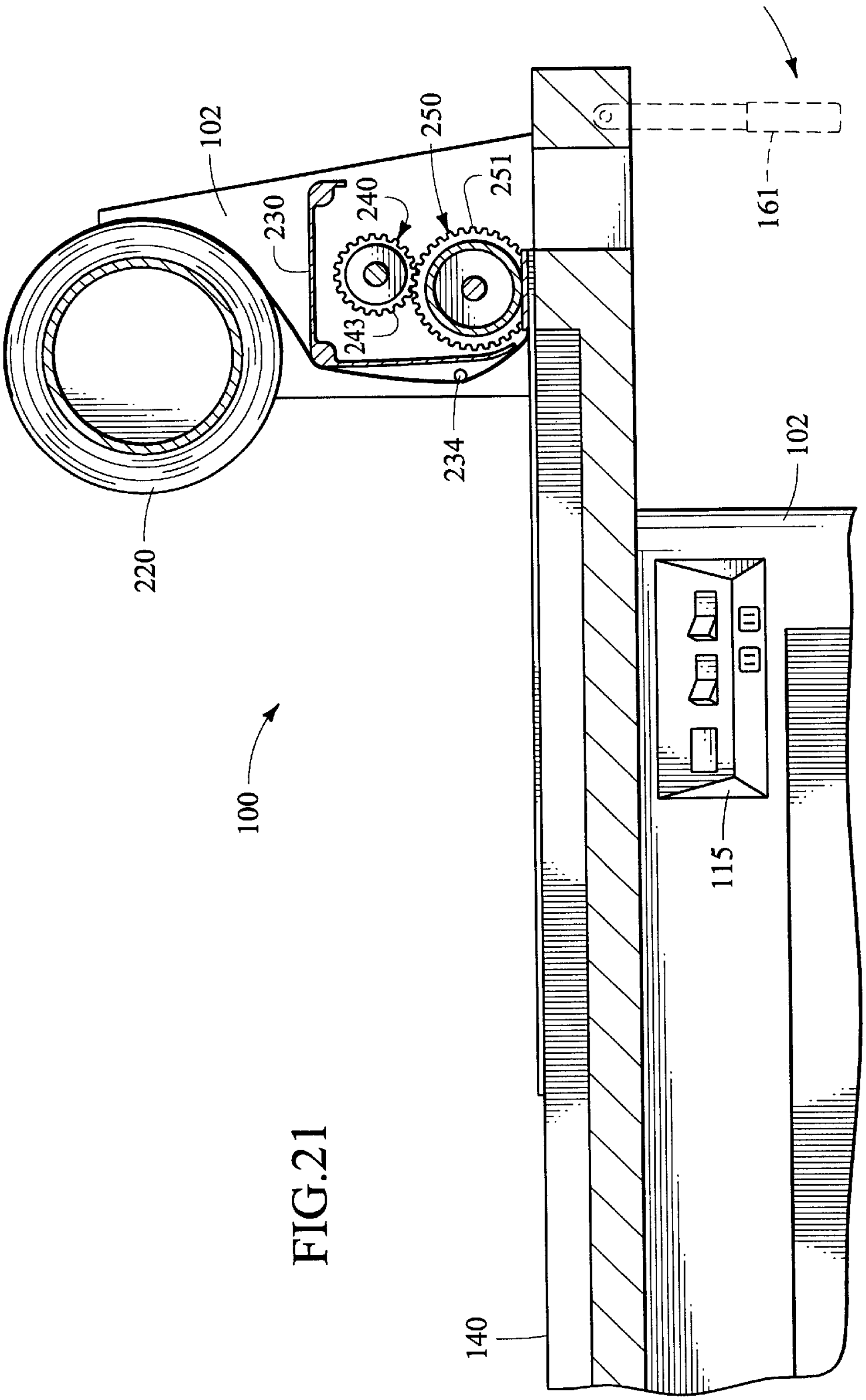

FIG. 21 shows positioning the sign substrate in a suitable position on the lay-out table to receive the appliqués. For example the positioning can occur by placing the sign substrate upon the lay-out surface in a position the same or approximating the position of the laid-out appliqués which were adhered by the transfer sheet in steps described above.

FIG. 21 also shows that the carriage and applicator have been lowered by lowering the handle 161. This also preferably includes elevationally adjusting the carriage to the proper height for the thicker substrate.

Figure 22:
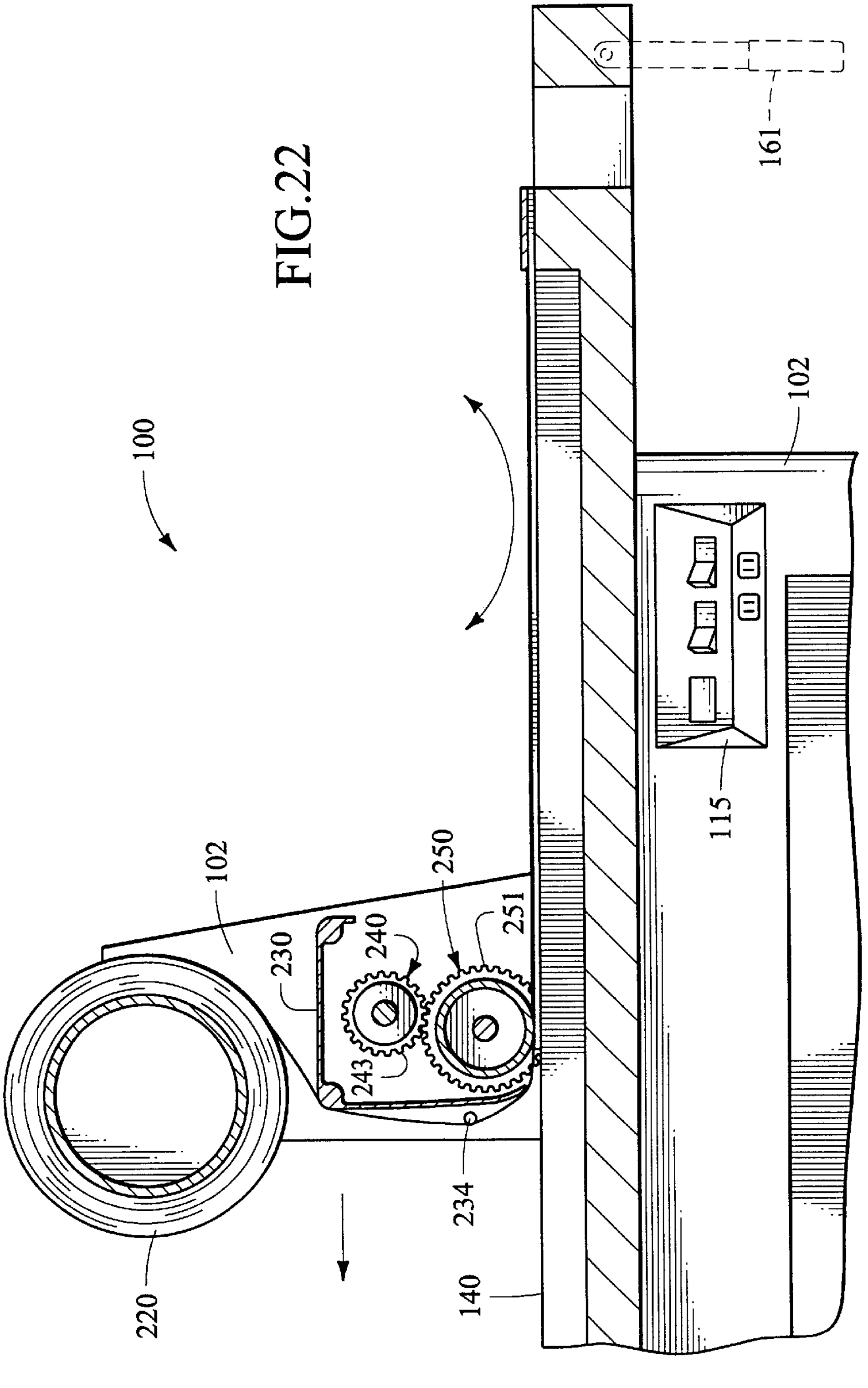

FIG. 22 shows that the methods may also involve moving the carriage assembly relative to the lay-out surface in the first direction. This will advantageously effect an unrolling action of the transfer sheet roll which carries the adhered appliqués. As the unrolling action occurs the appliqués are moved into juxtaposition with the sign substrate.

The substrate will typically be thicker than the carrier paper and thus the carriage and applicator need to be properly positioned. This can be done either prior to, during or as the moving begins. The methods can also include adjusting the height of the carriage, in particular the elevation of the applicator. This is advantageously done using the elevators described hereinabove or a similarly functioning structure. The adjusting or elevating step or steps are used to provide the correct pressure between the applicator, transfer paper, appliqués and sign substrate.

FIG. 22 illustrates that methods hereto may also include pressing the applicator against the transfer sheet and appliqués to impress the appliqués onto the sign substrate. This may be reinforced by manually pressing or rubbing to improve the bonding between the appliqués and the substrate. It is also appropriate to effect this by passing a straight edge over the non-adherent surface of the transfer paper and thereby smoothing the transfer paper and adhered applique s onto the substrate.

Figure 23:
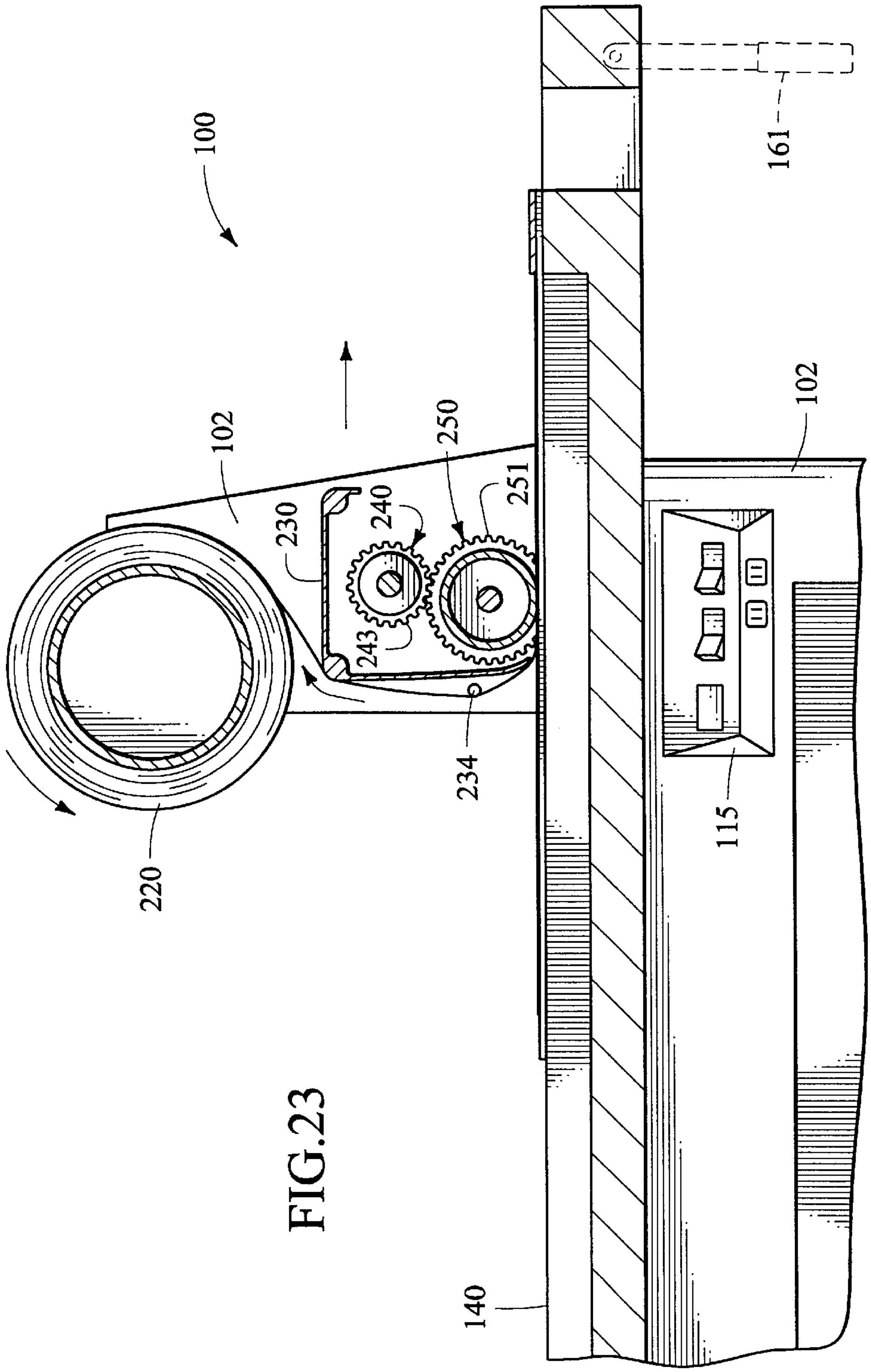

FIG. 23 illustrates that the processes may further include removing the transfer sheet from the appliqués applied to the substrate. This is advantageously done by moving the carriage in the second direction and rewinding the transfer sheet onto the transfer roll.

Figure 24:
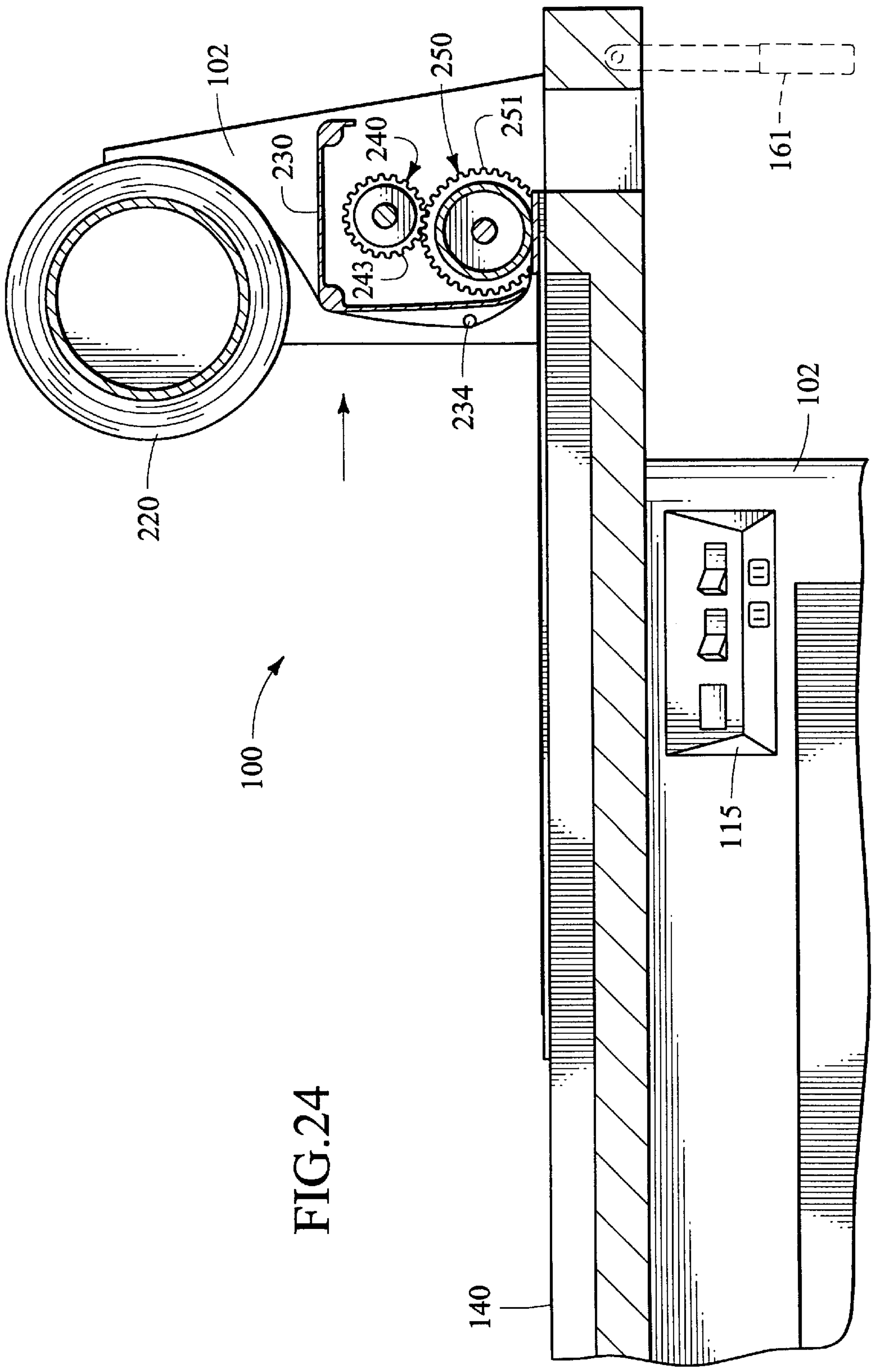

FIG. 24 shows the carriage fully retracted and the transfer paper rewound. The rewound transfer paper is usually in good enough condition to he reused which is contrary to common practice not employing the invention. In such common practice, the transfer paper is not in sufficiently good condition to he reused and is placed for disposal. Thus the invention may help to reduce the amount of transfer paper required to make signage.

Figure 25:
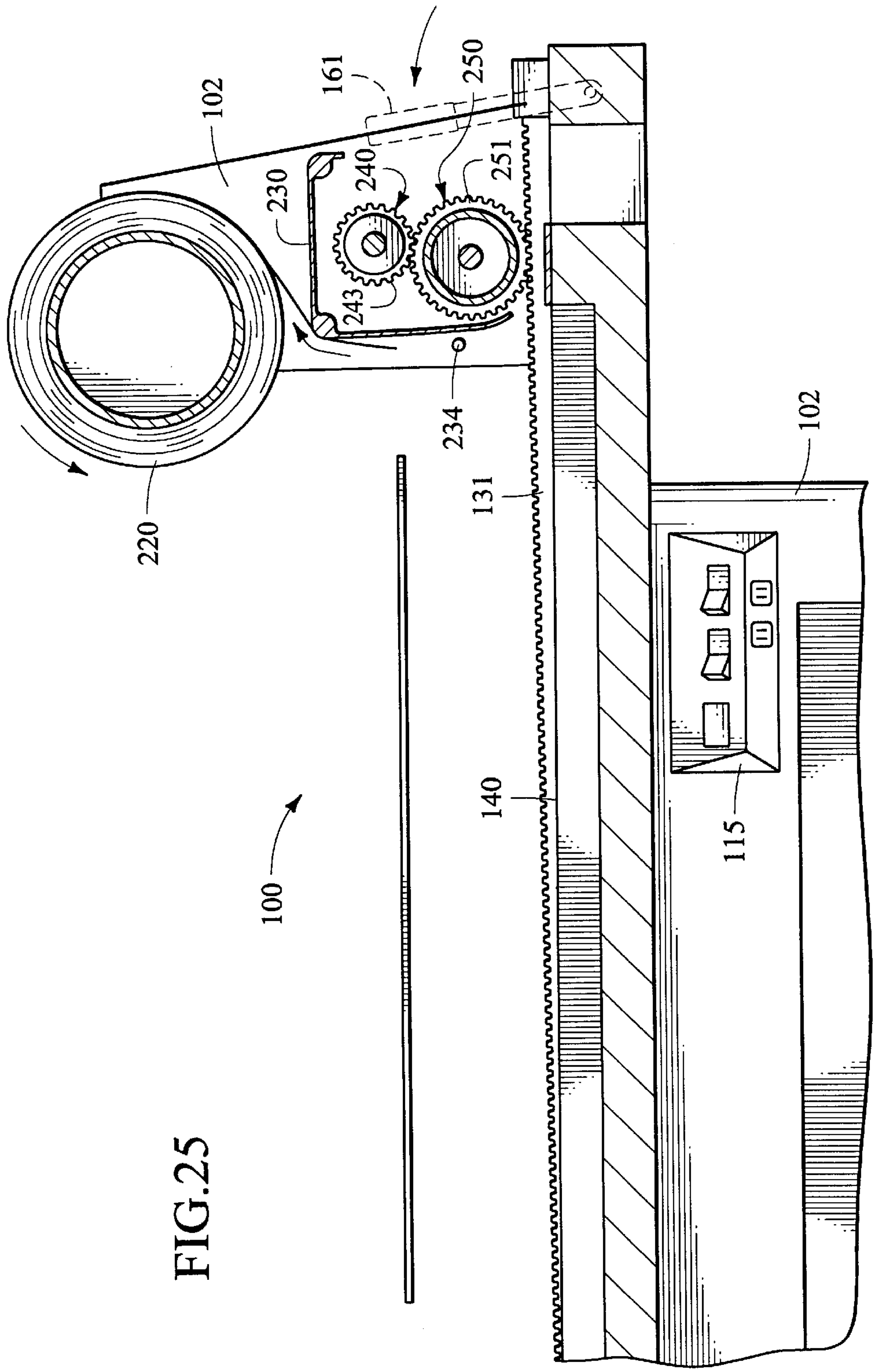

FIG. 25 shows the carriage retracted and the sign being removed from the lay-out table with the appliqués applied to the sign substrate.

Manner of Making

The invention is preferably manufactured using preexisting metal and plastic working techniques. The various part of apparatus 100 can be fabricated from a variety of suitable materials such as commonly available sheet metal, such as steel. The gears and gear racks are made for common steel or other materials which are conventionally made into such items.

General and Interpretational Explanation

Various forms and aspects of the invention lave been described. It should also be understood that the invention may in alternative forms include one or more of the aspects or features shown in one embodiment implemented into another embodiment. Thus the various combinations of features shown herein can be combined in such alternative ways to further set out alternative forms of the invention.

The invention has been described in compliance with the statute. In doing so the invention has necessarily been described in language more or less specific as to structural and methodical features. It is to be understood, however, that the invention is not limited to the specific features shown and described, since the features and methods disclosed herein comprise preferred forms of putting the invention into effect, and cannot describe all options for implementation. The invention is, therefore, claimed in any of its forms or modifications within the proper scope of the appended claims appropriately interpreted in accordance with the doctrine of equivalents.

I claim:

1. A sign making apparatus capable of dispensing and applying an adherent transfer sheet to sign appliqués and retrieving the transfer sheet and adhered appliqués for application onto a sign substrate, comprising:

a layout surface upon which sign appliqués can be placed into a desired arrangement for making a sign composed of the sign appliqués;

a carriage support mounted upon the apparatus, said carriage support having opposing side portions that extend along opposing sides of the layout surface; said carrier support being mounted for elevational positioning relative to the layout surface;

a carriage having opposing ends which are mounted upon the carriage support at the opposing side portions, said carriage extending over the layout surface, said carriage also being movable along the carriage support over a range of carriage positions;

a carriage drive which is controllable to provide coordinated positioning and movement of the opposing ends of the carriage upon the carriage support to position the carriage at differing carriage positions along the layout surface;

a transfer roll support mounted upon the carriage for supporting a roll of transfer sheet in a manner allowing transfer sheet to be unrolled therefrom onto the layout surface and re-rolled onto the transfer roll support;

at least one applicator roll mounted upon the carriage for rolling the transfer sheet against the sign appliqués positioned on the layout surface when the at least one elevator is properly positioned;

at least one elevator for controllably changing the elevational position of the applicator roll relative to the layout surface.

2. An apparatus according to claim 1 wherein the carriage support includes mechanical features which engage with parts mounted upon the carriage drive to provide positive mechanical engagement between the carriage support and carriage drive.

3. An apparatus according to claim 1 wherein the carriage support includes gear racks that engage with gears forming part of the carriage drive.

4. An apparatus according to claim 1 wherein the carriage drive includes a shaft that extends across the carriage to drive each side of the carriage.

5. An apparatus according to claim 1 wherein the carriage drive includes:

a shaft that extends across the carriage to drive each side of the carriage;

an operator feature that allows the shaft to be operated from at least one side of the carriage.

6. An apparatus according to claim 1 wherein the carriage drive includes:

a shaft that extends across the carriage to drive each side of the carriage;

an operator crank that allows the shaft to be operated from at least one side of the carriage.

7. An apparatus according to claim 1 wherein the layout surface is provided at least partially upon a transparent panel.

8. An apparatus according to claim 1 wherein the layout surface is provided at least partially upon a transparent panel;

and further including a layout surface light which beams light through the transparent panel.

9. An apparatus according to claim 1 and wherein the layout surface is provided with grid lines to facilitate laying out the sign appliqués.

10. An apparatus according to claim 1 wherein:

the layout surface is provided at least partially upon a transparent panel;

the layout surface is provided with grid lines to facilitate laying out the sign appliqués;

and further including a layout surface light which beams light through the transparent panel.

11. An apparatus according to claim 1 and further comprising a table frame that supports the layout surface and carriage at a desired working height.

12. A sign making apparatus capable of dispensing and applying an adherent transfer sheet to sign appliqués and retrieving the transfer sheet and adhered appliqués for application onto a sign substrate, comprising:

a layout surface upon which sign appliqués can be placed into a desired arrangement for making a sign composed of the sign appliqués;

a carriage support mounted upon the apparatus, said carriage support having opposing side portions that extend along opposing sides of the layout surface; said carrier support being mounted for elevational positioning relative to the layout surface;

a carriage having opposing ends which are mounted upon the carriage support at the opposing side portions, said carriage extending over the layout surface, said carriage also being movable along the carriage support over a range of carriage positions;

a carriage drive which is controllable to provide coordinated positioning and movement of the opposing ends of the carriage upon the carriage support to position the carriage at differing carriage positions along the layout surface;

a transfer roll support mounted upon the carriage for supporting a roll of transfer sheet in a manner allowing transfer sheet to be unrolled therefrom onto the layout surface and re-rolled onto the transfer roll support;

at least one applicator roll mounted upon the carriage for rolling the transfer sheet against the sign appliqués positioned on the layout surface when the at least one elevator is properly positioned;

an applicator roll drive which drives the at least one applicator roll at a peripheral velocity which nearly matches the velocity of the carriage as the carriage is moved by the carriage drive;

at least one elevator for controllably changing the elevational position of the applicator roll relative to the layout surface.

13. An apparatus according to claim 12 wherein the carriage support includes mechanical features which engage with parts mounted upon the carriage drive to provide positive mechanical engagement between the carriage support and carriage drive.

14. An apparatus according to claim 12 wherein the carriage support includes gear racks that engage with gears forming part of the carriage drive.

15. An apparatus according to claim 12 wherein the carriage drive includes a shaft that extends across the carriage to drive each side of the carriage.

16. An apparatus according to claim 12 wherein the carriage drive includes:

a shaft that extends across the carriage to drive each side of the carriage;

an operator feature that allows the shaft to be operated from at least one side of the carriage.

17. An apparatus according to claim 12 wherein the carriage drive includes:

a shaft that extends across the carriage to drive each side of the carriage;

an operator crank that allows the shaft to be operated from at least one side of the carriage.

18. An apparatus according to claim 12 wherein the layout surface is provided at least partially upon a transparent panel.

19. An apparatus according to claim 12 wherein the layout surface is provided at least partially upon a transparent panel;

and further including a layout surface light which beams light through the transparent panel.

20. An apparatus according to claim 12 and wherein the layout surface is provided with grid lines to facilitate laying out the sign appliqués.

21. An apparatus according to claim 12 wherein:

the layout surface is provided at least partially upon a transparent panel;

the layout surface is provided with grid lines to facilitate laying out the sign appliqués;

and further including a layout surface light which beams light through the transparent panel.

22. An apparatus according to claim 12 and further comprising a table frame that supports the layout surface and carriage at a desired working height.

23. A sign making apparatus capable of dispensing and applying an adherent transfer sheet to sign appliqués and retrieving the transfer sheet and adhered appliqués for application onto a sign substrate, comprising:

a layout surface upon which sign appliqués can be placed into a desired arrangement for making a sign composed of the sign appliqués;

a carriage support mounted upon the apparatus, said carriage support having opposing side portions that extend along opposing sides of the layout surface, said carriage support being mounted for controlled movement allowing elevational positioning of the carriage support in relation to the layout surface;

at least one elevator for controllably changing the elevational position of the carriage support relative to the layout surface;

a carriage having opposing ends which are mounted upon the carriage support at the opposing side portions, said carriage extending over the layout surface, said carriage also being movable along the carriage support over a range of carriage positions;

a transfer roll support mounted upon the carriage for supporting a roll of transfer sheet in a manner allowing transfer sheet to be unrolled therefrom onto the layout surface and re-rolled onto the transfer roll support;

a carriage drive which is controllable to provide coordinated positioning and movement of the opposing ends of the carriage upon the carriage support to position the carriage at differing carriage positions along the layout surface;

at least one applicator roll mounted upon the carriage for rolling the transfer sheet against the sign appliqués positioned on the layout surface when the at least one elevator is properly positioned;

an applicator roll drive which drives the at least one applicator roll at a peripheral velocity which nearly matches the velocity of the carriage as the carriage is moved by the carriage drive.

24. An apparatus according to claim 23 wherein the carriage support includes mechanical features which engage with parts mounted upon the carriage drive to provide positive mechanical engagement between the carriage support and carriage drive.

25. An apparatus according to claim 23 wherein the carriage support includes gear racks that engage with gears forming part of the carriage drive.

26. An apparatus according to claim 23 wherein the carriage drive includes a shaft that extends across the carriage to drive each side of the carriage.

27. An apparatus according to claim 23 wherein the carriage drive includes:

a shaft that extends across the carriage to drive each side of the carriage;

an operator feature that allows the shaft to be operated from at least one side of the carriage.

28. An apparatus according to claim 23 wherein the carriage drive includes:

a shaft that extends across the carriage to drive each side of the carriage;

an operator crank that allows the shaft to be operated from at least one side of the carriage.

29. An apparatus according to claim 23 wherein the layout surface is provided at least partially upon a transparent panel.

30. An apparatus according to claim 23 wherein the layout surface is provided at least partially upon a transparent panel;

and further including a layout surface light which beams light through the transparent panel.

31. An apparatus according to claim 23 and wherein the layout surface is provided with grid lines to facilitate laying out the sign appliqués.

32. An apparatus according to claim 23 wherein:

the layout surface is provided at least partially upon a transparent panel;

the layout surface is provided with grid lines to facilitate laying out the sign appliqués;

and further including a layout surface light which beams light through the transparent panel.

33. An apparatus according to claim 23 and further comprising a table frame that supports the layout surface and carriage at a desired working height.

34. A sign making apparatus capable of dispensing and applying an adherent transfer sheet to sign appliqués and retrieving the transfer sheet and adhered appliqués for application onto a sign substrate, comprising:

a layout surface upon which sign appliqués can be placed into a desired arrangement for making a sign composed of the sign appliqués; said layout surface being provided at least partially upon a transparent panel, and the layout surface is provided with grid lines to facilitate laying out the sign appliqués;

a layout surface light which beams light through the transparent panel;

a carriage support mounted upon the apparatus, said carriage support having opposing side portions that extend along opposing sides of the layout surface, said opposing side portions include gear racks, said carriage support being mounted for controlled movement allowing elevational positioning of the carriage support in relation to the layout surface;

at least one elevator for controllably changing the elevational position of the carriage support relative to the layout surface;

a carriage having opposing ends which are mounted upon the carriage support at the opposing side portions, said carriage extending over the layout surface, said carriage also being movable along the carriage support over a range of carriage positions;

a transfer roll support mounted upon the carriage for supporting a roll of transfer sheet in a manner allowing transfer sheet to be unrolled therefrom onto the layout surface and re-rolled onto the transfer roll support;

a carriage drive which is controllable to provide coordinated positioning and movement of the opposing ends of the carriage by engagement with said gear racks upon the carriage support to position the carriage at differing carriage positions along the layout surface;

at least one applicator roll mounted upon the carriage for rolling the transfer sheet against the sign appliqués positioned on the layout surface when the at least one elevator is properly positioned;

an applicator roll drive which drives the at least one applicator roll at a peripheral velocity which nearly matches the velocity of the carriage as the carriage is moved by the carriage drive, said applicator roll drive being mechanically coupled to the carriage drive and gear racks to provide coordinated movement therebetween.

35. An apparatus according to claim 34 wherein the carriage drive includes a shaft that extends across the carriage to drive each side of the carriage.

36. An apparatus according to claim 34 wherein the carriage drive includes:

a shaft that extends across the carriage to drive each side of the carriage;

an operator feature that allows the shaft to be operated from at least one side of the carriage.

37. An apparatus according to claim 34 wherein the carriage drive includes:

a shaft that extends across the carriage to drive each side of the carriage;

an operator crank that allows the shaft to be operated from at least one side of the carriage.

38. A sign making apparatus capable of dispensing and applying an adherent transfer sheet to sign appliqués and retrieving the transfer sheet and adhered appliqués for application onto a sign substrate, comprising:

a layout surface upon which sign appliqués can be placed into a desired arrangement for making a sign composed of the sign appliqués;

a carriage support mounted upon the apparatus, said carriage support having opposing side portions that extend along opposing sides of the layout surface, said carriage support being mounted for controlled movement allowing elevational positioning of the carriage support in relation to the layout surface;

a carriage having opposing ends which are mounted upon the carriage support at the opposing side portions, said carriage extending over the layout surface, said carriage also being movable along the carriage support over a range of carriage positions;

a transfer roll support mounted upon the carriage for supporting a roll of transfer sheet in a manner allowing transfer sheet to be unrolled therefrom onto the layout surface and re-rolled onto the transfer roll support;

a carriage drive which is controllable to provide coordinated positioning and movement of the opposing ends of the carriage upon the carriage support to position the carriage at differing carriage positions along the layout surface;

at least one applicator roll mounted upon the carriage for rolling the transfer sheet against the sign appliqués positioned on the layout surface;

at least one elevator for controllably changing the elevational position of the applicator roll relative to the layout surface.

39. An apparatus according to claim 38 wherein the carriage support includes mechanical features which engage with parts mounted upon the carriage drive to provide positive mechanical engagement between the carriage support and carriage drive.

40. An apparatus according to claim 38 wherein the carriage support includes gear racks that engage with gears forming part of the carriage drive.

41. An apparatus according to claim 38 wherein the carriage drive includes a shaft that extends across the carriage to drive each side of the carriage.

42. An apparatus according to claim 38 wherein the carriage drive includes:

a shaft that extends across the carriage to drive each side of the carriage;

an operator feature that allows the shaft to be operated from at least one side of the carriage.

43. An apparatus according to claim 38 wherein the carriage drive includes:

a shaft that extends across the carriage to drive each side of the carriage;

an operator crank that allows the shaft to be operated from at least one side of the carriage.

44. An apparatus according to claim 38 wherein the layout surface is provided at least partially upon a transparent panel.

45. An apparatus according to claim 38 wherein the layout surface is provided at least partially upon a transparent panel;

and further including a layout surface light which beams light through the transparent panel.

46. An apparatus according to claim 38 and wherein the layout surface is provided with grid lines to facilitate laying out the sign appliqués.

47. An apparatus according to claim 38 wherein:

the layout surface is provided at least partially upon a transparent panel;

the layout surface is provided with grid lines to facilitate laying out the sign appliqués;

and further including a layout surface light which beams light through the transparent panel.

48. An apparatus according to claim 38 and further comprising a table frame that supports the layout surface and carriage at a desired working height.

* * * * *